(12) United States Patent
Erhart et al.

(10) Patent No.: US 9,195,877 B2
(45) Date of Patent: Nov. 24, 2015

(54) METHODS AND DEVICES FOR CAPACITIVE IMAGE SENSING

(71) Applicant: Synaptics Incorporated, San Jose, CA (US)

(72) Inventors: Richard Alexander Erhart, Tempe, AZ (US); Paul Wickboldt, Walnut Creek, CA (US)

(73) Assignee: Synaptics Incorporated, San Jose, CA (US)

( * ) Notice: Subject to any disclaimer, the term of this patent is extended or adjusted under 35 U.S.C. 154(b) by 338 days.

(21) Appl. No.: 13/720,508

(22) Filed: Dec. 19, 2012

(65) Prior Publication Data

US 2013/0177220 A1 Jul. 11, 2013

Related U.S. Application Data

(60) Provisional application No. 61/579,994, filed on Dec. 23, 2011.

(51) Int. Cl.
*G06K 9/20* (2006.01)
*G06K 9/00* (2006.01)

(52) U.S. Cl.
CPC .................................. *G06K 9/0002* (2013.01)

(58) Field of Classification Search
None
See application file for complete search history.

(56) References Cited

U.S. PATENT DOCUMENTS

| 4,151,512 | A | 4/1979 | Rigannati et al. |
| 4,225,850 | A | 9/1980 | Chang et al. |
| 4,310,827 | A | 1/1982 | Asi |
| 4,353,056 | A | 10/1982 | Tsikos |
| 4,405,829 | A | 9/1983 | Rivest et al. |
| 4,525,859 | A | 6/1985 | Bowles et al. |
| 4,550,221 | A | 10/1985 | Mabusth |

(Continued)

FOREIGN PATENT DOCUMENTS

| DE | 2213813 A1 | 10/1973 |
| EP | 0929028 A2 | 1/1998 |

(Continued)

OTHER PUBLICATIONS

Matsumoto et al., Impact of Artificial "Gummy" Fingers on Fingerprint Systems, SPIE 4677 (2002), reprinted from cryptome.org.

(Continued)

*Primary Examiner* — Brian P Werner
(74) *Attorney, Agent, or Firm* — Leydig, Voit & Mayer, Ltd

(57) ABSTRACT

A sensing circuit and method is disclosed, which may comprise a plurality of transmitting or receiving elements each defining a pixel location defined by a gap between the respective one of the plurality of transmitting or receiving elements and a single element of the opposing type to the respective transmitting or receiving element, and a controller configured to provide or receive a probing signal to or from a group of at least two of the plurality of transmitting or receiving elements, at the same time, thereby increasing the effective area providing the transmitting of or the receiving of the probing signal for each pixel location imaged. The group of transmitting or receiving elements may form a symmetric pattern, which may be centered on the pixel location. The plurality of transmitting or receiving elements may form at least one linear pixel array with the respective single receiving or transmitting element.

16 Claims, 15 Drawing Sheets

(56) References Cited

U.S. PATENT DOCUMENTS

| | | |
|---|---|---|
| 4,580,790 A | 4/1986 | Doose |
| 4,582,985 A | 4/1986 | Loftberg |
| 4,675,544 A | 6/1987 | Shrenk |
| 4,758,622 A | 7/1988 | Gosselin |
| 4,817,183 A | 3/1989 | Sparrow |
| 5,076,566 A | 12/1991 | Kriegel |
| 5,109,427 A | 4/1992 | Yang |
| 5,140,642 A | 8/1992 | Hau et al. |
| 5,305,017 A | 4/1994 | Gerpheide |
| 5,319,323 A | 6/1994 | Fong |
| 5,325,442 A | 6/1994 | Knapp |
| 5,359,243 A | 10/1994 | Norman |
| 5,420,936 A | 5/1995 | Fitzpatrick et al. |
| 5,422,807 A | 6/1995 | Mitra et al. |
| 5,429,006 A | 7/1995 | Tamori |
| 5,456,256 A | 10/1995 | Schneider et al. |
| 5,543,591 A | 8/1996 | Gillespie et al. |
| 5,569,901 A | 10/1996 | Bridgelall et al. |
| 5,623,552 A | 4/1997 | Lane |
| 5,627,316 A | 5/1997 | De Winter et al. |
| 5,650,842 A | 7/1997 | Maase et al. |
| 5,717,777 A | 2/1998 | Wong et al. |
| 5,781,651 A | 7/1998 | Hsiao et al. |
| 5,801,681 A | 9/1998 | Sayag |
| 5,818,956 A | 10/1998 | Tuli |
| 5,838,306 A | 11/1998 | O'Connor |
| 5,848,176 A | 12/1998 | Harra et al. |
| 5,850,450 A | 12/1998 | Schweitzer et al. |
| 5,852,670 A | 12/1998 | Setlak et al. |
| 5,864,296 A | 1/1999 | Upton |
| 5,887,343 A | 3/1999 | Salatino et al. |
| 5,892,824 A | 4/1999 | Beatson et al. |
| 5,903,225 A | 5/1999 | Schmitt et al. |
| 5,915,757 A | 6/1999 | Tsuyama et al. |
| 5,920,384 A | 7/1999 | Borza |
| 5,920,640 A | 7/1999 | Salatino et al. |
| 5,940,526 A | 8/1999 | Setlak et al. |
| 5,963,679 A | 10/1999 | Setlak |
| 5,995,630 A | 11/1999 | Borza |
| 5,999,637 A | 12/1999 | Toyoda et al. |
| 6,002,815 A | 12/1999 | Immega et al. |
| 6,011,859 A | 1/2000 | Kalnitsky et al. |
| 6,016,355 A | 1/2000 | Dickinson et al. |
| 6,052,475 A | 4/2000 | Upton |
| 6,067,368 A | 5/2000 | Setlak et al. |
| 6,073,343 A | 6/2000 | Petrick et al. |
| 6,076,566 A | 6/2000 | Lowe |
| 6,088,585 A | 7/2000 | Schmitt et al. |
| 6,098,175 A | 8/2000 | Lee |
| 6,118,318 A | 9/2000 | Fifield et al. |
| 6,134,340 A | 10/2000 | Hsu et al. |
| 6,157,722 A | 12/2000 | Lerner et al. |
| 6,161,213 A | 12/2000 | Lofstrom |
| 6,175,407 B1 | 1/2001 | Santor |
| 6,182,076 B1 | 1/2001 | Yu et al. |
| 6,182,892 B1 | 2/2001 | Angelo et al. |
| 6,185,318 B1 | 2/2001 | Jain et al. |
| 6,234,031 B1 | 5/2001 | Suga |
| 6,241,288 B1 | 6/2001 | Bergenek et al. |
| 6,259,108 B1 | 7/2001 | Antonelli et al. |
| 6,289,114 B1 | 9/2001 | Mainguet |
| 6,292,272 B1 | 9/2001 | Okauchi et al. |
| 6,317,508 B1 | 11/2001 | Kramer et al. |
| 6,320,394 B1 | 11/2001 | Tartagni |
| 6,325,285 B1 | 12/2001 | Baratelli |
| 6,327,376 B1 | 12/2001 | Harkin |
| 6,332,193 B1 | 12/2001 | Glass et al. |
| 6,333,989 B1 | 12/2001 | Borza |
| 6,337,919 B1 | 1/2002 | Duton |
| 6,343,162 B1 | 1/2002 | Saito et al. |
| 6,346,739 B1 | 2/2002 | Lepert et al. |
| 6,347,040 B1 | 2/2002 | Fries et al. |
| 6,357,663 B1 | 3/2002 | Takahashi et al. |
| 6,360,004 B1 | 3/2002 | Akizuki |
| 6,362,633 B1 | 3/2002 | Tartagni |
| 6,392,636 B1 | 5/2002 | Ferrari et al. |
| 6,399,994 B2 | 6/2002 | Shobu |
| 6,400,836 B2 | 6/2002 | Senior |
| 6,408,087 B1 | 6/2002 | Kramer |
| 6,473,072 B1 | 10/2002 | Comiskey et al. |
| 6,509,501 B2 | 1/2003 | Eicken et al. |
| 6,525,547 B2 | 2/2003 | Hayes |
| 6,525,932 B1 | 2/2003 | Ohnishi et al. |
| 6,539,101 B1 | 3/2003 | Black |
| 6,580,816 B2 | 6/2003 | Kramer et al. |
| 6,597,289 B2 | 7/2003 | Sabatini |
| 6,628,812 B1 | 9/2003 | Setlak et al. |
| 6,631,201 B1 | 10/2003 | Dickinson et al. |
| 6,643,389 B1 | 11/2003 | Raynal et al. |
| 6,672,174 B2 | 1/2004 | Deconde et al. |
| 6,710,461 B2 | 3/2004 | Chou et al. |
| 6,738,050 B2 | 5/2004 | Comiskey et al. |
| 6,741,729 B2 | 5/2004 | Bjorn et al. |
| 6,757,002 B1 | 6/2004 | Oross et al. |
| 6,766,040 B1 | 7/2004 | Catalano et al. |
| 6,785,407 B1 | 8/2004 | Tschudi et al. |
| 6,799,275 B1 | 9/2004 | Bjorn et al. |
| 6,836,230 B2 | 12/2004 | Le Pailleur et al. |
| 6,838,905 B1 | 1/2005 | Doyle |
| 6,873,356 B1 | 3/2005 | Kanbe et al. |
| 6,886,104 B1 | 4/2005 | McClurg et al. |
| 6,897,002 B2 | 5/2005 | Teraoka et al. |
| 6,898,299 B1 | 5/2005 | Brooks |
| 6,924,496 B2 | 8/2005 | Manansala |
| 6,937,748 B1 | 8/2005 | Schneider et al. |
| 6,941,001 B1 | 9/2005 | Bolle et al. |
| 6,941,810 B2 | 9/2005 | Okada |
| 6,950,540 B2 | 9/2005 | Higuchi |
| 6,959,874 B2 | 11/2005 | Bardwell |
| 6,963,626 B1 | 11/2005 | Shaeffer et al. |
| 6,970,584 B2 | 11/2005 | O'Gorman et al. |
| 6,980,672 B2 | 12/2005 | Saito et al. |
| 6,983,882 B2 | 1/2006 | Cassone |
| 7,013,030 B2 | 3/2006 | Wong et al. |
| 7,020,591 B1 | 3/2006 | Wei et al. |
| 7,030,860 B1 | 4/2006 | Hsu et al. |
| 7,031,670 B2 | 4/2006 | May |
| 7,035,443 B2 | 4/2006 | Wong |
| 7,042,535 B2 | 5/2006 | Katoh et al. |
| 7,043,061 B2 | 5/2006 | Hamid et al. |
| 7,043,644 B2 | 5/2006 | DeBruine |
| 7,046,230 B2 | 5/2006 | Zadesky et al. |
| 7,064,743 B2 | 6/2006 | Nishikawa |
| 7,099,496 B2 * | 8/2006 | Benkley, III .................. 382/124 |
| 7,110,574 B2 | 9/2006 | Haruki et al. |
| 7,110,577 B1 | 9/2006 | Tschud |
| 7,113,622 B2 | 9/2006 | Hamid |
| 7,126,389 B1 | 10/2006 | McRae et al. |
| 7,129,926 B2 | 10/2006 | Mathiassen et al. |
| 7,136,514 B1 | 11/2006 | Wong |
| 7,146,024 B2 | 12/2006 | Benkley |
| 7,146,026 B2 | 12/2006 | Russon et al. |
| 7,146,029 B2 | 12/2006 | Manansala |
| 7,184,581 B2 | 2/2007 | Johansen et al. |
| 7,190,209 B2 | 3/2007 | Kang et al. |
| 7,190,816 B2 | 3/2007 | Mitsuyu et al. |
| 7,194,392 B2 | 3/2007 | Tuken et al. |
| 7,197,168 B2 | 3/2007 | Russo |
| 7,200,250 B2 | 4/2007 | Chou |
| 7,251,351 B2 | 7/2007 | Mathiassen et al. |
| 7,258,279 B2 | 8/2007 | Schneider et al. |
| 7,260,246 B2 | 8/2007 | Fujii |
| 7,263,212 B2 | 8/2007 | Kawabe |
| 7,263,213 B2 | 8/2007 | Rowe |
| 7,289,649 B1 | 10/2007 | Walley et al. |
| 7,290,323 B2 | 11/2007 | Deconde et al. |
| 7,308,121 B2 | 12/2007 | Mathiassen et al. |
| 7,308,122 B2 | 12/2007 | McClurg et al. |
| 7,321,672 B2 | 1/2008 | Sasaki et al. |
| 7,356,169 B2 | 4/2008 | Hamid |
| 7,360,688 B1 | 4/2008 | Harris |
| 7,369,685 B2 | 5/2008 | DeLeon |
| 7,379,569 B2 | 5/2008 | Chikazawa et al. |
| 7,408,135 B2 | 8/2008 | Fujeda |

(56) References Cited

U.S. PATENT DOCUMENTS

| | | |
|---|---|---|
| 7,409,876 B2 | 8/2008 | Ganapathi et al. |
| 7,412,083 B2 | 8/2008 | Takahashi |
| 7,424,618 B2 | 9/2008 | Roy et al. |
| 7,447,339 B2 | 11/2008 | Mimura et al. |
| 7,447,911 B2 | 11/2008 | Chou et al. |
| 7,460,697 B2 | 12/2008 | Erhart et al. |
| 7,463,756 B2 | 12/2008 | Benkley |
| 7,505,611 B2 | 3/2009 | Fyke |
| 7,505,613 B2 | 3/2009 | Russo |
| 7,565,548 B2 | 7/2009 | Fiske et al. |
| 7,574,022 B2 | 8/2009 | Russo |
| 7,596,832 B2 | 10/2009 | Hsieh et al. |
| 7,643,950 B1 | 1/2010 | Getzin et al. |
| 7,646,897 B2 | 1/2010 | Fyke |
| 7,681,232 B2 | 3/2010 | Nordentoft et al. |
| 7,689,013 B2 | 3/2010 | Shinzaki |
| 7,706,581 B2 | 4/2010 | Drews et al. |
| 7,733,697 B2 | 6/2010 | Picca et al. |
| 7,751,601 B2 | 7/2010 | Benkley |
| 7,826,645 B1 | 11/2010 | Cayen |
| 7,843,438 B2 | 11/2010 | Onoda |
| 7,848,798 B2 | 12/2010 | Martinsen et al. |
| 7,899,216 B2 | 3/2011 | Watanabe et al. |
| 7,953,258 B2 | 5/2011 | Dean et al. |
| 8,005,276 B2 | 8/2011 | Dean et al. |
| 8,031,916 B2 | 10/2011 | Abiko et al. |
| 8,063,734 B2 | 11/2011 | Conforti |
| 8,077,935 B2 | 12/2011 | Geoffroy et al. |
| 8,107,212 B2 | 1/2012 | Nelson et al. |
| 8,116,540 B2 | 2/2012 | Dean et al. |
| 8,131,026 B2 | 3/2012 | Benkley et al. |
| 8,165,355 B2 | 4/2012 | Benkley et al. |
| 8,175,345 B2 | 5/2012 | Gardner |
| 8,204,281 B2 | 6/2012 | Satya et al. |
| 8,224,044 B2 | 7/2012 | Benkley |
| 8,229,184 B2 | 7/2012 | Benkley |
| 8,276,816 B2 | 10/2012 | Gardner |
| 8,278,946 B2 | 10/2012 | Thompson |
| 8,290,150 B2 | 10/2012 | Erhart et al. |
| 8,315,444 B2 | 11/2012 | Gardner |
| 8,331,096 B2 | 12/2012 | Garcia |
| 8,358,815 B2 | 1/2013 | Benkley et al. |
| 8,374,407 B2 | 2/2013 | Benkley et al. |
| 8,391,568 B2 | 3/2013 | Satyan |
| 2001/0026636 A1 | 10/2001 | Mainget |
| 2001/0030644 A1 | 10/2001 | Allport |
| 2001/0036299 A1 | 11/2001 | Senior |
| 2001/0043728 A1 | 11/2001 | Kramer et al. |
| 2002/0025062 A1 | 2/2002 | Black |
| 2002/0061125 A1 | 5/2002 | Fujii |
| 2002/0064892 A1 | 5/2002 | Lepert et al. |
| 2002/0067845 A1 | 6/2002 | Griffis |
| 2002/0073046 A1 | 6/2002 | David |
| 2002/0089044 A1 | 7/2002 | Simmons et al. |
| 2002/0089410 A1 | 7/2002 | Janiak et al. |
| 2002/0096731 A1 | 7/2002 | Wu et al. |
| 2002/0122026 A1 | 9/2002 | Bergstrom |
| 2002/0126516 A1 | 9/2002 | Jeon |
| 2002/0133725 A1 | 9/2002 | Roy et al. |
| 2002/0152048 A1 | 10/2002 | Hayes |
| 2002/0181749 A1 | 12/2002 | Matsumoto et al. |
| 2003/0002717 A1 | 1/2003 | Hamid |
| 2003/0002719 A1 | 1/2003 | Hamid et al. |
| 2003/0021495 A1 | 1/2003 | Cheng |
| 2003/0035570 A1 | 2/2003 | Benkley |
| 2003/0063782 A1 | 4/2003 | Acharya et al. |
| 2003/0068072 A1 | 4/2003 | Hamid |
| 2003/0076301 A1 | 4/2003 | Tsuk et al. |
| 2003/0076303 A1 | 4/2003 | Huppi |
| 2003/0095096 A1 | 5/2003 | Robbin et al. |
| 2003/0095690 A1 | 5/2003 | Su et al. |
| 2003/0102874 A1 | 6/2003 | Lane et al. |
| 2003/0123714 A1 | 7/2003 | O'Gorman et al. |
| 2003/0123715 A1 | 7/2003 | Uchida |
| 2003/0141959 A1 | 7/2003 | Keogh et al. |
| 2003/0147015 A1 | 8/2003 | Katoh et al. |
| 2003/0161510 A1 | 8/2003 | Fujii |
| 2003/0161512 A1 | 8/2003 | Mathiassen |
| 2003/0169228 A1 | 9/2003 | Mathiassen et al. |
| 2003/0174871 A1 | 9/2003 | Yoshioka et al. |
| 2003/0186157 A1 | 10/2003 | Teraoka et al. |
| 2003/0209293 A1 | 11/2003 | Sako et al. |
| 2003/0224553 A1 | 12/2003 | Manansala |
| 2004/0012773 A1 | 1/2004 | Puttkammer |
| 2004/0017934 A1 | 1/2004 | Kocher et al. |
| 2004/0022001 A1 | 2/2004 | Chu et al. |
| 2004/0042642 A1 | 3/2004 | Bolle et al. |
| 2004/0050930 A1 | 3/2004 | Rowe |
| 2004/0066613 A1 | 4/2004 | Leitao |
| 2004/0076313 A1 | 4/2004 | Bronstein et al. |
| 2004/0081339 A1 | 4/2004 | Benkley |
| 2004/0096086 A1 | 5/2004 | Miyasaka |
| 2004/0113956 A1 | 6/2004 | Bellwood et al. |
| 2004/0120400 A1 | 6/2004 | Linzer |
| 2004/0125993 A1 | 7/2004 | Zhao et al. |
| 2004/0129787 A1 | 7/2004 | Saito |
| 2004/0136612 A1 | 7/2004 | Meister et al. |
| 2004/0155752 A1 | 8/2004 | Radke |
| 2004/0172339 A1 | 9/2004 | Snelgrove et al. |
| 2004/0179718 A1 | 9/2004 | Chou |
| 2004/0184641 A1 | 9/2004 | Nagasaka et al. |
| 2004/0188838 A1 | 9/2004 | Okada et al. |
| 2004/0190761 A1 | 9/2004 | Lee |
| 2004/0208346 A1 | 10/2004 | Baharav et al. |
| 2004/0208347 A1 | 10/2004 | Baharav et al. |
| 2004/0208348 A1 | 10/2004 | Baharav et al. |
| 2004/0213441 A1 | 10/2004 | Tschudi |
| 2004/0215689 A1 | 10/2004 | Dooley et al. |
| 2004/0228505 A1 | 11/2004 | Sugimoto |
| 2004/0228508 A1 | 11/2004 | Shigeta |
| 2004/0240712 A1 | 12/2004 | Rowe et al. |
| 2004/0252867 A1 | 12/2004 | Lan et al. |
| 2005/0031174 A1 | 2/2005 | Ryhanen et al. |
| 2005/0036665 A1 | 2/2005 | Higuchi |
| 2005/0047485 A1 | 3/2005 | Khayrallah et al. |
| 2005/0100196 A1 | 5/2005 | Scott et al. |
| 2005/0100938 A1 | 5/2005 | Hoffmann et al. |
| 2005/0109835 A1 | 5/2005 | Jacoby et al. |
| 2005/0110103 A1 | 5/2005 | Setlak |
| 2005/0111708 A1 | 5/2005 | Chou |
| 2005/0123176 A1 | 6/2005 | Ishil et al. |
| 2005/0129291 A1 | 6/2005 | Boshra |
| 2005/0136200 A1 | 6/2005 | Durell et al. |
| 2005/0139656 A1 | 6/2005 | Arnouse |
| 2005/0139685 A1 | 6/2005 | Kozlay |
| 2005/0162402 A1 | 7/2005 | Watanachote |
| 2005/0169503 A1 | 8/2005 | Howell et al. |
| 2005/0174015 A1 | 8/2005 | Scott et al. |
| 2005/0175104 A1* | 8/2005 | Honda et al. ............ 375/240.18 |
| 2005/0210271 A1 | 9/2005 | Chou et al. |
| 2005/0219200 A1 | 10/2005 | Weng |
| 2005/0220329 A1 | 10/2005 | Payne et al. |
| 2005/0231213 A1 | 10/2005 | Chou et al. |
| 2005/0238212 A1 | 10/2005 | Du et al. |
| 2005/0244038 A1 | 11/2005 | Benkley |
| 2005/0244039 A1 | 11/2005 | Geoffroy et al. |
| 2005/0247559 A1 | 11/2005 | Frey et al. |
| 2005/0249386 A1 | 11/2005 | Juh |
| 2005/0258952 A1 | 11/2005 | Utter et al. |
| 2005/0269402 A1 | 12/2005 | Spitzer et al. |
| 2006/0006224 A1 | 1/2006 | Modi |
| 2006/0055500 A1 | 3/2006 | Burke et al. |
| 2006/0066572 A1 | 3/2006 | Yumoto et al. |
| 2006/0078176 A1 | 4/2006 | Abiko et al. |
| 2006/0083411 A1 | 4/2006 | Benkley |
| 2006/0110537 A1 | 5/2006 | Huang et al. |
| 2006/0138333 A1* | 6/2006 | Nascetti et al. .......... 250/370.09 |
| 2006/0140461 A1 | 6/2006 | Kim et al. |
| 2006/0144953 A1 | 7/2006 | Takao |
| 2006/0170528 A1 | 8/2006 | Funushige et al. |
| 2006/0181521 A1 | 8/2006 | Perrault et al. |
| 2006/0182319 A1 | 8/2006 | Setlak et al. |
| 2006/0187200 A1 | 8/2006 | Martin |
| 2006/0210082 A1 | 9/2006 | Devadas et al. |

(56) References Cited

U.S. PATENT DOCUMENTS

| | | |
|---|---|---|
| 2006/0214512 A1 | 9/2006 | Iwata |
| 2006/0214767 A1 | 9/2006 | Carrieri |
| 2006/0239514 A1 | 10/2006 | Watanabe et al. |
| 2006/0249008 A1 | 11/2006 | Luther |
| 2006/0259873 A1 | 11/2006 | Mister |
| 2006/0261174 A1 | 11/2006 | Zellner et al. |
| 2006/0267125 A1 | 11/2006 | Huang et al. |
| 2006/0267385 A1 | 11/2006 | Steenwyk et al. |
| 2006/0271793 A1 | 11/2006 | Devadas et al. |
| 2006/0285728 A1 | 12/2006 | Leung et al. |
| 2006/0287963 A1 | 12/2006 | Steeves et al. |
| 2007/0031011 A1 | 2/2007 | Erhart et al. |
| 2007/0036400 A1 | 2/2007 | Watanabe et al. |
| 2007/0057763 A1 | 3/2007 | Blattner et al. |
| 2007/0058843 A1 | 3/2007 | Theis et al. |
| 2007/0067828 A1 | 3/2007 | Bychkov |
| 2007/0076926 A1 | 4/2007 | Schneider et al. |
| 2007/0076951 A1 | 4/2007 | Tanaka et al. |
| 2007/0086634 A1 | 4/2007 | Setlak et al. |
| 2007/0090312 A1 | 4/2007 | Stallinga et al. |
| 2007/0138299 A1 | 6/2007 | Mitra |
| 2007/0154072 A1 | 7/2007 | Taraba et al. |
| 2007/0160269 A1 | 7/2007 | Kuo |
| 2007/0180261 A1 | 8/2007 | Akkermans et al. |
| 2007/0196002 A1 | 8/2007 | Choi et al. |
| 2007/0198141 A1 | 8/2007 | Moore |
| 2007/0198435 A1 | 8/2007 | Siegal et al. |
| 2007/0228154 A1 | 10/2007 | Tran |
| 2007/0237366 A1 | 10/2007 | Maletsky |
| 2007/0237368 A1 | 10/2007 | Bjorn et al. |
| 2007/0248249 A1 | 10/2007 | Stoianov |
| 2007/0290124 A1 | 12/2007 | Neil et al. |
| 2008/0002867 A1 | 1/2008 | Mathiassen et al. |
| 2008/0013805 A1 | 1/2008 | Sengupta et al. |
| 2008/0019578 A1 | 1/2008 | Saito et al. |
| 2008/0049987 A1 | 2/2008 | Champagne et al. |
| 2008/0049989 A1 | 2/2008 | Iseri et al. |
| 2008/0063245 A1 | 3/2008 | Benkley et al. |
| 2008/0069412 A1 | 3/2008 | Champagne et al. |
| 2008/0126260 A1 | 5/2008 | Cox et al. |
| 2008/0169345 A1 | 7/2008 | Keane et al. |
| 2008/0170695 A1 | 7/2008 | Adler et al. |
| 2008/0175450 A1 | 7/2008 | Scott et al. |
| 2008/0178008 A1 | 7/2008 | Takahashi et al. |
| 2008/0179112 A1 | 7/2008 | Qin et al. |
| 2008/0185429 A1 | 8/2008 | Saville |
| 2008/0201265 A1 | 8/2008 | Hewton |
| 2008/0205714 A1 | 8/2008 | Benkley et al. |
| 2008/0219521 A1 | 9/2008 | Benkley et al. |
| 2008/0222049 A1 | 9/2008 | Loomis et al. |
| 2008/0223925 A1 | 9/2008 | Saito et al. |
| 2008/0226132 A1 | 9/2008 | Gardner |
| 2008/0240523 A1 | 10/2008 | Benkley et al. |
| 2008/0240537 A1 | 10/2008 | Yang et al. |
| 2008/0244277 A1 | 10/2008 | Orsini et al. |
| 2008/0267462 A1 | 10/2008 | Nelson et al. |
| 2008/0279373 A1 | 11/2008 | Erhart et al. |
| 2008/0317290 A1 | 12/2008 | Tazoe |
| 2009/0001999 A1 | 1/2009 | Douglas |
| 2009/0130369 A1 | 5/2009 | Huang et al. |
| 2009/0153297 A1 | 6/2009 | Gardner |
| 2009/0154779 A1 | 6/2009 | Satyan et al. |
| 2009/0155456 A1 | 6/2009 | Benkley et al. |
| 2009/0169071 A1 | 7/2009 | Bond et al. |
| 2009/0174974 A1 | 7/2009 | Huang et al. |
| 2009/0212902 A1 | 8/2009 | Haddock |
| 2009/0218698 A1 | 9/2009 | Lam |
| 2009/0237135 A1 | 9/2009 | Ramaraju et al. |
| 2009/0252384 A1 | 10/2009 | Dean et al. |
| 2009/0252385 A1 | 10/2009 | Dean et al. |
| 2009/0252386 A1 | 10/2009 | Dean et al. |
| 2009/0279742 A1 | 11/2009 | Abiko |
| 2009/0319435 A1 | 12/2009 | Little et al. |
| 2009/0324028 A1 | 12/2009 | Russo |
| 2010/0026451 A1 | 2/2010 | Erhart et al. |
| 2010/0045705 A1 | 2/2010 | Vertegaal et al. |
| 2010/0083000 A1 | 4/2010 | Kesanupalli et al. |
| 2010/0117794 A1 | 5/2010 | Adams et al. |
| 2010/0119124 A1 | 5/2010 | Satyan |
| 2010/0123675 A1 | 5/2010 | Ippel |
| 2010/0127366 A1 | 5/2010 | Bond et al. |
| 2010/0176823 A1 | 7/2010 | Thompson et al. |
| 2010/0176892 A1 | 7/2010 | Thompson et al. |
| 2010/0177940 A1 | 7/2010 | Thompson et al. |
| 2010/0180136 A1 | 7/2010 | Thompson et al. |
| 2010/0189314 A1 | 7/2010 | Benkley et al. |
| 2010/0208953 A1 | 8/2010 | Gardner et al. |
| 2010/0244166 A1 | 9/2010 | Shibuta et al. |
| 2010/0272329 A1 | 10/2010 | Benkley |
| 2010/0284565 A1 | 11/2010 | Benkley et al. |
| 2011/0002461 A1 | 1/2011 | Erhart et al. |
| 2011/0018556 A1 | 1/2011 | Le et al. |
| 2011/0090047 A1 | 4/2011 | Patel |
| 2011/0102567 A1 | 5/2011 | Erhart |
| 2011/0102569 A1 | 5/2011 | Erhart |
| 2011/0175703 A1 | 7/2011 | Benkley |
| 2011/0176037 A1 | 7/2011 | Benkley |
| 2011/0182486 A1 | 7/2011 | Valfridsson et al. |
| 2011/0214924 A1 | 9/2011 | Perezselsky et al. |
| 2011/0267298 A1 | 11/2011 | Erhart et al. |
| 2011/0298711 A1 | 12/2011 | Dean et al. |
| 2011/0304001 A1 | 12/2011 | Erhart et al. |
| 2012/0044639 A1 | 2/2012 | Garcia |
| 2012/0189166 A1 | 7/2012 | Russo |
| 2012/0189172 A1 | 7/2012 | Russo |
| 2012/0206586 A1 | 8/2012 | Gardner |
| 2012/0256280 A1 | 10/2012 | Ehart |
| 2012/0257032 A1 | 10/2012 | Benkley |
| 2012/0308092 A1 | 12/2012 | Benkley et al. |
| 2013/0021044 A1 | 1/2013 | Thompson et al. |

FOREIGN PATENT DOCUMENTS

| | | |
|---|---|---|
| EP | 0905646 A1 | 3/1999 |
| EP | 0973123 A1 | 1/2000 |
| EP | 1018697 A2 | 7/2000 |
| EP | 1139301 A2 | 10/2001 |
| EP | 1531419 A2 | 5/2005 |
| EP | 1533759 A1 | 5/2005 |
| EP | 1538548 A2 | 6/2005 |
| EP | 1624399 B1 | 2/2006 |
| EP | 1775674 A1 | 4/2007 |
| EP | 1939788 A1 | 7/2008 |
| GB | 2331613 A | 5/1999 |
| GB | 2480919 | 12/2011 |
| GB | 2487661 A1 | 8/2012 |
| GB | 2489100 A | 9/2012 |
| GB | 2490192 | 10/2012 |
| JP | 01094418 A2 | 4/1989 |
| JP | 04158434 A2 | 6/1992 |
| JP | 2005011002 A | 1/2005 |
| JP | 2005242856 | 9/2005 |
| JP | 2007305097 A | 11/2007 |
| TW | 200606745 A | 2/2006 |
| TW | 200620140 A | 6/2006 |
| TW | 200629167 A | 8/2006 |
| WO | WO 90/03620 A1 | 4/1990 |
| WO | WO 98/58342 A1 | 12/1998 |
| WO | WO 99/28701 A1 | 6/1999 |
| WO | WO 99/43258 A1 | 9/1999 |
| WO | WO 01/22349 A1 | 3/2001 |
| WO | WO 01/94902 A2 | 12/2001 |
| WO | WO 01/94902 A3 | 12/2001 |
| WO | WO 01/95304 A1 | 12/2001 |
| WO | WO 02/11066 A1 | 2/2002 |
| WO | WO 02/47018 A2 | 6/2002 |
| WO | WO 02/47018 A3 | 6/2002 |
| WO | WO 02/61668 A1 | 8/2002 |
| WO | WO 02/77907 A1 | 10/2002 |
| WO | WO 03/063054 A2 | 7/2003 |
| WO | WO 03/075210 A2 | 9/2003 |
| WO | WO 2004/066194 A1 | 8/2004 |
| WO | WO 2004/066693 A1 | 8/2004 |
| WO | WO 2005/0104012 A1 | 11/2005 |

(56) References Cited

FOREIGN PATENT DOCUMENTS

| | | |
|---|---|---|
| WO | WO 2005/106774 A2 | 11/2005 |
| WO | WO 2005/106774 A3 | 11/2005 |
| WO | WO 2006/040724 A1 | 4/2006 |
| WO | WO 2006/041780 A1 | 4/2006 |
| WO | WO 2007/011607 A1 | 1/2007 |
| WO | WO 2008/033264 A2 | 3/2008 |
| WO | WO 2008/033264 A3 | 3/2008 |
| WO | WO 2008/033265 A2 | 6/2008 |
| WO | WO 2008/033265 A3 | 6/2008 |
| WO | WO 2008/137287 A1 | 11/2008 |
| WO | WO 2009/002599 A2 | 12/2008 |
| WO | WO 2009/002599 A3 | 12/2008 |
| WO | WO 2009/029257 A1 | 6/2009 |
| WO | WO 2009/079219 A1 | 6/2009 |
| WO | WO 2009/079221 A2 | 6/2009 |
| WO | WO 2009/079257 A1 | 6/2009 |
| WO | WO 2009/079262 A1 | 6/2009 |
| WO | WO 2010/034036 A1 | 3/2010 |
| WO | WO 2010/036445 A1 | 4/2010 |
| WO | WO 2010/143597 A1 | 12/2010 |
| WO | WO 2011/088248 A1 | 1/2011 |
| WO | WO/2011/088252 A1 | 1/2011 |
| WO | WO 2011/053797 A1 | 5/2011 |

OTHER PUBLICATIONS

Maltoni, "Handbook of Fingerprint Recognition", XP002355942 Springer, New York, USA, Jun. 2003 pp. 65-69.

Vermasan, et al., "A 500 dpi AC Capacitive Hybrid Flip-Chip CMOS ASIC/Sensor Module for Fingerprint, Navigation, and Pointer Detection With On-Chip Data Processing", IEEE Journal of Solid State Circuits, vol. 38, No. 12, Dec. 2003, pp. 2288-2294.

Ratha, et al. "Adaptive Flow Orientation Based Feature Extraction in Fingerprint Images," Pattern Recognition, vol. 28 No. 11, 1657-1672, Nov. 1995.

Ratha, et al., "A Real Time Matching System for Large Fingerprint Databases," IEEE, Aug. 1996.

Suh, et al., "Design and Implementation of the AEGIS Single-Chip Secure Processor Using Physical Random Functions", Computer Architecture, 2005, ISCA '05, Proceedings, 32nd International Symposium, Jun. 2005 (MIT Technical Report CSAIL CSG-TR-843, 2004.

Rivest, et al., "A Method for Obtaining Digital Signatures and Public-Key Cryptosystems", Communication of the ACM, vol. 21 (2), pp. 120-126. (1978).

Hiltgen, et al., "Secure Internet Banking Authentication", IEEE Security and Privacy, IEEE Computer Society, New York, NY, US, Mar. 1, 2006, pp. 24-31, XP007908655, ISSN: 1540-7993.

Hegt, "Analysis of Current and Future Phishing Attacks on Internet Banking Services", Mater Thesis. Techische Universiteit Eindhoven—Department of Mathematics and Computer Science May 31, 2008, pp. 1-149, XP002630374, Retrieved from the Internet: URL:http://alexandria.tue.nl/extral/afstversl/wsk-i/hgt2008.pdf [retrieved on Mar. 29, 2011] *pp. 127-134, paragraph 6.2*.

Gassend, et al., "Controlled Physical Random Functions", In Proceedings of the 18th Annual Computer Security Conference, Las Vegas, Nevada, Dec. 12, 2002.

Wikipedia (Mar. 2003). "Integrated Circuit," http://en.wikipedia.org/wiki/integrated_circuit. Revision as of Mar. 23, 2003.

Wikipedia (Dec. 2006). "Integrated circuit" Revision as of Dec. 10, 2006. http://en.widipedia.org/wiki/Integrated_circuit.

Bellagiodesigns.com (Internet Archive Wayback Machine, www.bellagiodesigns.com date: Oct. 29, 2005).

Closed Loop Systems, The Free Dictionary, http://www.thefreedictionary.com/closed-loop+system (downloaded Dec. 1, 2011).

Feedback: Electronic Engineering, Wikipedia, p. 5 http://en.wikipedia.org/wiki/Feedback#Electronic_engineering (downloaded Dec. 1, 2011).

Galy et al. (Jul. 2007) "A full fingerprint verification system for a single-line sweep sensor." IEEE Sensors J., vol. 7 No. 7, pp. 1054-1065.

* cited by examiner

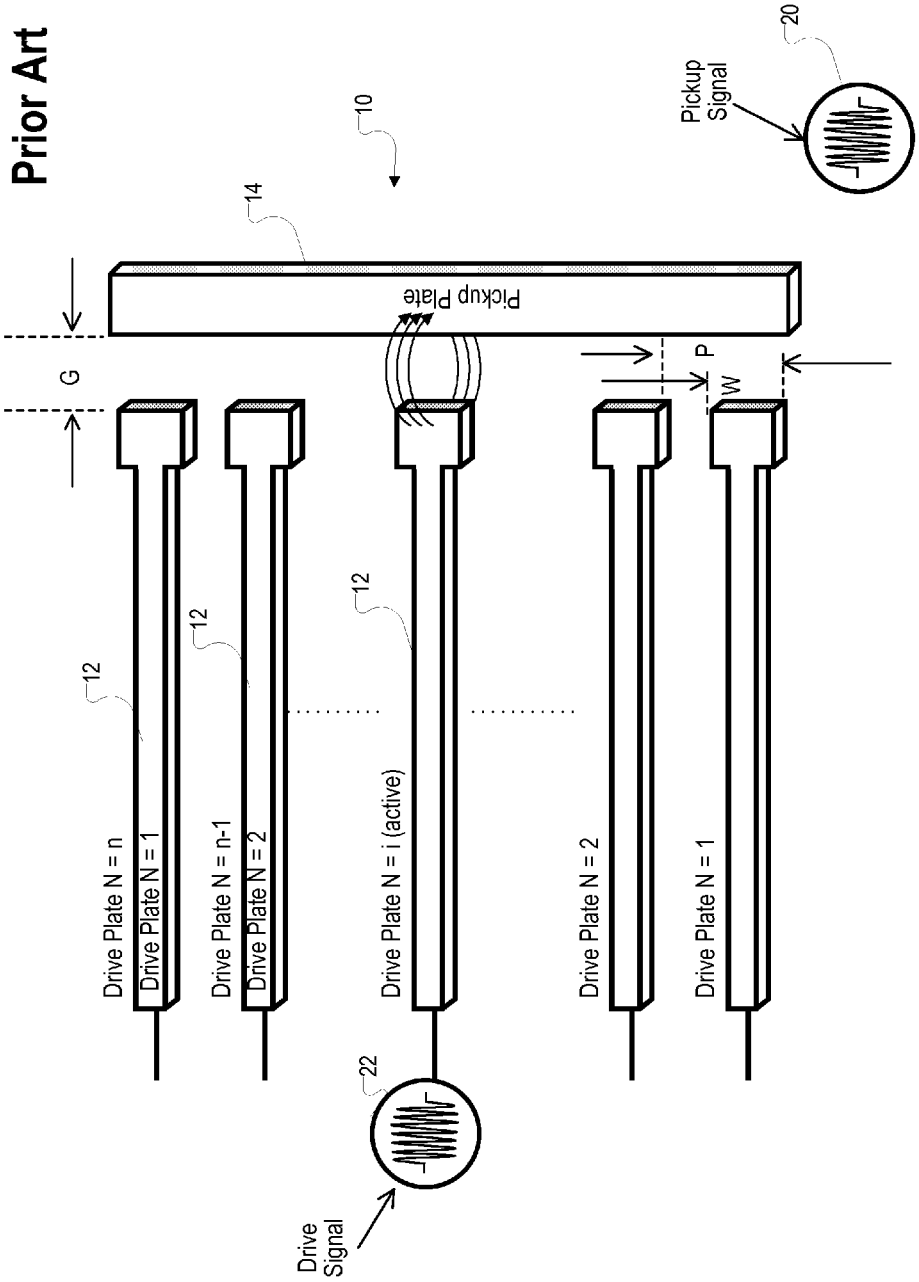

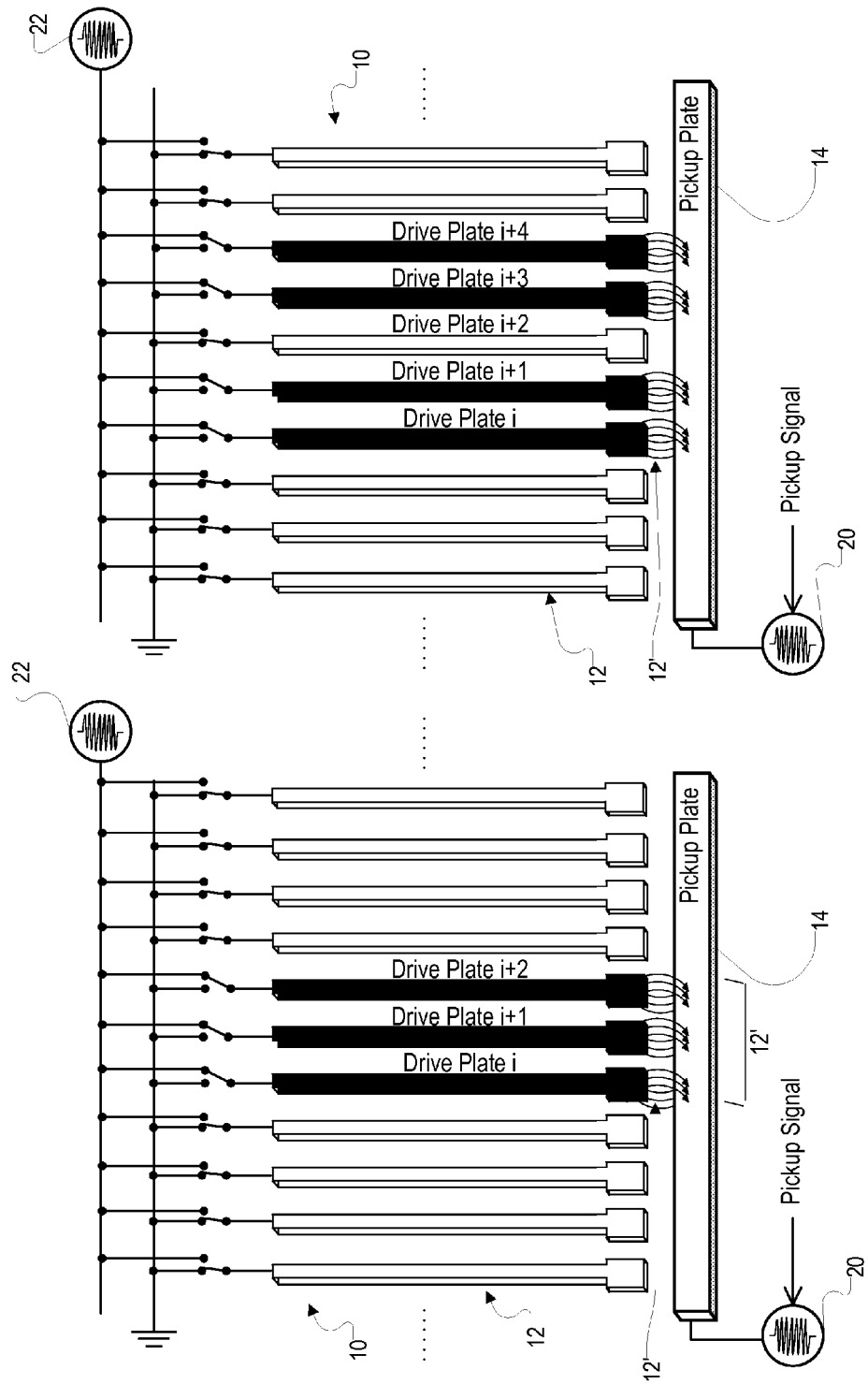

METHODS AND DEVICES FOR CAPACITIVE IMAGE SENSING

CROSS-REFERENCE

This application claims the benefit of U.S. Provisional Patent application No. 61/579,994, entitled METHODS AND DEVICES FOR CAPACITIVE IMAGE SENSING, filed on Dec. 23, 2011, which application is incorporated herein by reference, including all of the specification, Drawing and claims, for all purposes.

FIELD

The disclosed subject matter relates to image sensors and signal processing, e.g., a capacitive image sensor, such as for sensing biometrics, e.g., fingerprint images, including through a layer of dielectric material, with an improved signal level, such as an improved signal to noise level, thus improving, e.g., the ability to sense the biometric image through the dielectric. In addition, the disclosed subject matter may be in the form of a grid array of sensors.

BACKGROUND

The disclosed subject matter pertains to linear capacitive image sensors and the methods by which they are operated. Examples of such sensors are described, for example, in U.S. Pat. No. 7,099,496 B2 for Swiped Aperture Capacitive Fingerprint Sensing Systems and Methods issued Aug. 29, 2006, and related successor and subsequent patents, such as U.S. Pat. No. 7,460,697 B2 for Electronic Fingerprint Sensor with Differential Noise Cancellation issued Dec. 2, 2008. In U.S. Pat. No. 7,099,496, a fingerprint sensor is described which includes an image sensor, a rate sensor and a sensing circuit. The described image sensor in U.S. Pat. No. 7,099,496 is an example of a linear array capacitance sensor which is of the type referred in this disclosure. In U.S. Pat. No. 7,460,697 there is disclosed such a sensor with two pickup plates and a differential amplifier to reduce noise effects. U.S. Pat. App. Pub. No. 2009/0252386 A1 for Apparatus and Method for Reducing Parasitic Capacitive Coupling and Noise in Fingerprint Sensing Circuits issued Oct. 8, 2009, discloses such a system where an energized drive plate and adjacent un-energized drive plates are selectively grounded to the same relatively noisy ground, while all other un-energized drive plates are grounded to a separate quiet ground. Aspects of embodiments of the disclosed subject matter in the present application improve upon the noise reduction and signal acquisition features of such devices. In addition aspects of the disclosed subject matter may be implemented in a 2D array of capacitive sensors.

In addition in the field of the disclosed subject matter according to aspects of embodiments of the disclosed subject matter improvement is provided for the needed ability to sense effectively biometric images, such as fingerprint images, through dielectric layers, such as layers of flex material, protective coatings, and layers of glass, such as in displays, etc., the material(s) being of ever increasing total thickness between actual sensor elements and the biometric being sensed, such as a fingerprint on a human finger. Part of the problem is improving the signal level and particularly the signal to nosse ratio. Aspects of the disclosed subject matter address these concerns.

SUMMARY

A sensing circuit and method are disclosed, which may comprise a plurality of transmitting or receiving elements each defining a pixel location defined by a gap between the respective one of the plurality of transmitting or receiving elements and a single element of the opposing type to the respective transmitting or receiving element, and a controller configured to provide or receive a probing signal to or from a group of at least two of the plurality of transmitting or receiving elements, at the same time, thereby increasing the effective area providing the transmitting of or the receiving of the probing signal for each pixel location imaged. The group of transmitting or receiving elements may form a symmetric pattern, which may be centered on the pixel location. The plurality of transmitting or receiving elements may form at least one linear pixel array with the respective single receiving or transmitting element. The at least one linear pixel array may comprise a first linear pixel array and a second linear pixel array; and the circuit may have an output signal generator combining the output of the pixel locations in the first linear pixel array and in the second linear pixel array. The controller may be configured to transmit or receive the probing signal for respective pixel locations being imaged randomly along the respective linear pixel array.

A biometric imaging apparatus and method are disclosed which may comprise a drive signal plate carrying a drive signal; a plurality of receiver signal plates defining a plurality of pixel locations with the drive signal plate; an electrical path from the drive signal plate to an active receiver signal plate, forming an active pixel location with the drive signal plate, the electrical path having a electro-magnetic characteristic that is altered in response to a feature of a biometric placed in the vicinity of the pixel location, and electro-magnetic noise imparted by the biometric at the active pixel location, thereby modulating a response signal received on the active receiver plate at the active pixel location, in response to the drive signal on the drive signal plate; and a noise reduction circuit having as a first input the response signal from the active pixel location and as a second input a signal, including at least in part a noise cancellation component, received from at least a portion of the plurality of receiver plates other than the active receiver plate. The drive signal plate may form with the plurality of receiver signal plates a linear one dimensional biometric sensor array of pixel locations, or may comprise one of a plurality of drive signal plates, forming with the plurality of receiver signal plates a two dimensional (2D) array of pixel locations. The electro-magnetic characteristic may comprise impedance, which may comprise at least in part capacitance forming a linear one dimensional (1D) capacitive gap sensor array or a two dimensional capacitive sensor array. The noise reduction circuit may comprise a differential amplifier; and the first input signal applied to one input terminal of the differential amplifier and the second input signal applied to the opposite input terminal of the differential amplifier.

The at least a portion of the plurality of receiver plates other than the active receiver plate may comprise a grouping of the plurality of receiver plates other than the active receiver plate. The active receiver plate may be centrally located within the grouping of the plurality of receiver plates other than the active receiver plate. The grouping of the plurality of receiver plates other than the active receiver plate may comprise all of the receiver plates other than the active receiver plate. The portion of the plurality of receiver plates other than the active receiver plate may be selected to provide a noise cancellation component that includes a balance in an amount of coupling versus loading of the first input and the second input.

A biometric imaging method may comprise supplying a drive signal to a drive signal plate; providing a plurality of receiver signal plates defining a plurality of pixel locations with the drive signal plate; forming an electrical path from the drive signal plate to an active receiver signal plate, forming an active pixel location with the drive signal plate, the electrical path having a electro-magnetic characteristic that is altered in response to a feature of a biometric placed in the vicinity of the pixel location, and electro-magnetic noise imparted by the biometric at the active pixel location, thereby modulating a response signal received on the active receiver plate at the active pixel location, in response to the drive signal on the drive signal plate; and utilizing a noise reduction circuit having as a first input the response signal from the active pixel location and as a second input a signal, including at least in part a noise cancellation component, received from at least a portion of the plurality of receiver plates.

INCORPORATION BY REFERENCE

All publications, patents, and patent applications mentioned in this specification are herein incorporated by reference to the same extent as if each individual publication, patent, or patent application was specifically and individually indicated to be incorporated by reference. References include, for example, U.S. Pat. No. 7,099,496 B2 to Benkley, issued Aug. 29, 2006, for Swiped Aperture Capacitive Fingerprint Sensing Systems and Methods; U.S. Pat. No. 7,463,756 B2 to Benkley, issued Dec. 9, 2009, for Finger Position Sensing Methods and Apparatus; U.S. Pat. No. 8,165,355 B2 to Benkley, issued Apr. 24, 2012, for Method and Apparatus for Fingerprint Motion tracking Using an In-Line Array for Use in Navigation Applications; U.S. Pat. No. 7,751,601 B2 to Benkley, issued Jul. 6, 2010, for Finger Sensing Assemblies and Methods of Making; U.S. Pat. No. 8,229,184 B2 to Benkley, issued Jul. 24, 2012, for Method and Algorithm for Accurate Finger Motion Tracking; U.S. Pat. No. 7,643,950 B1 to Getzin, issued Jan. 5, 2010, for System and Method for Minimizing Power Consumption for an Object Sensor.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1 shows a schematic view of portions of an existing linear array capacitive image sensor a modification of which can be utilized according to aspects of the disclosed subject matter;

FIG. 6 shows schematically and partly in block diagram for a group of drive plates being energized at the same time with the probing signal according to aspects of embodiments of the disclosed subject matter;

FIG. 7 shows schematically and partly in block diagram for a group of drive plates being energized at the same time with the probing signal according to aspects of embodiments of the disclosed subject matter;

DETAILED DESCRIPTION OF THE INVENTION

Figure 2A:
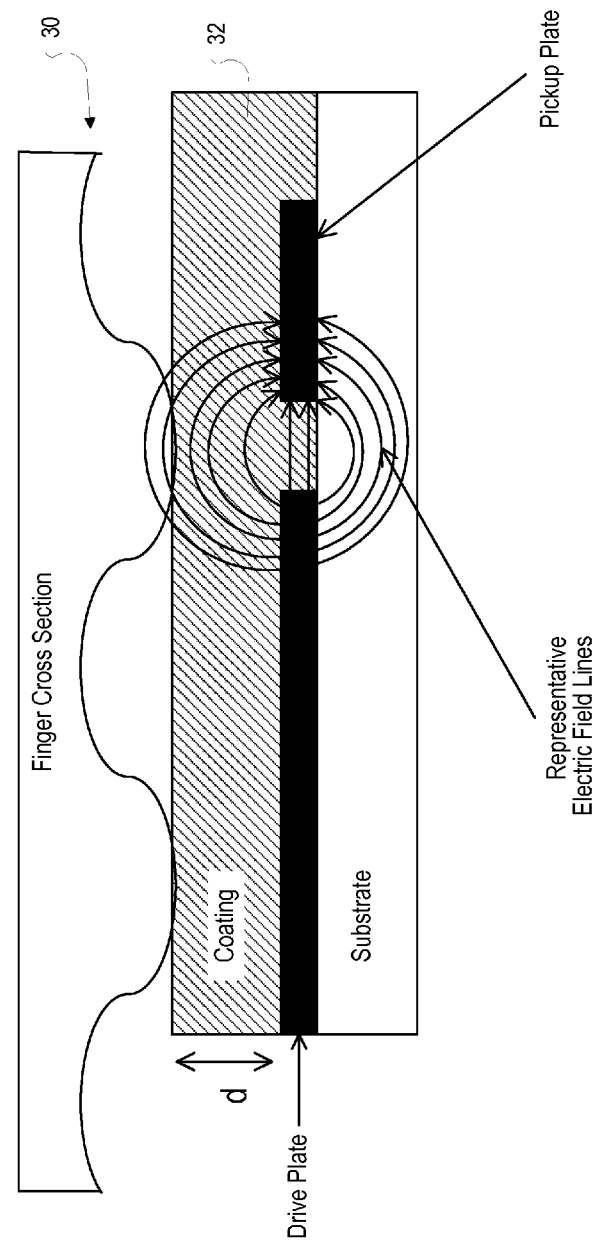
FIG. 2A shows a cross-sectional view, similar to that shown in U.S. Pat. No. 7,099,496, of a portion of a sensor of the type illustrated in FIG. 1, generally aligned to the direction of movement of the finger across a sensing gap between drive plates and a pickup plate, and assuming the portion of the finger being illustrated has ridges and valleys running generally perpendicular to the direction of movement of the finger across the sensor.
Figure 2B:
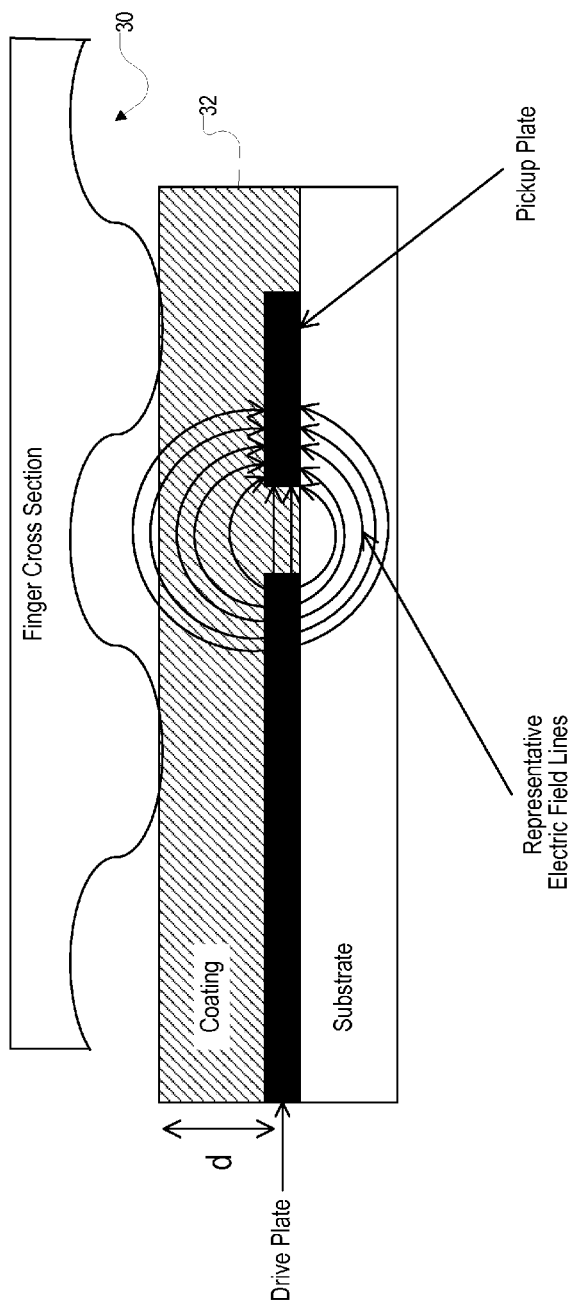
FIG. 2B shows a similar view to FIG. 2A, also similar to that shown in U.S. Pat. No. 7,099,496, with the finger having moved to present a valley to the sensing gap rather than a ridge.
Figure 3:
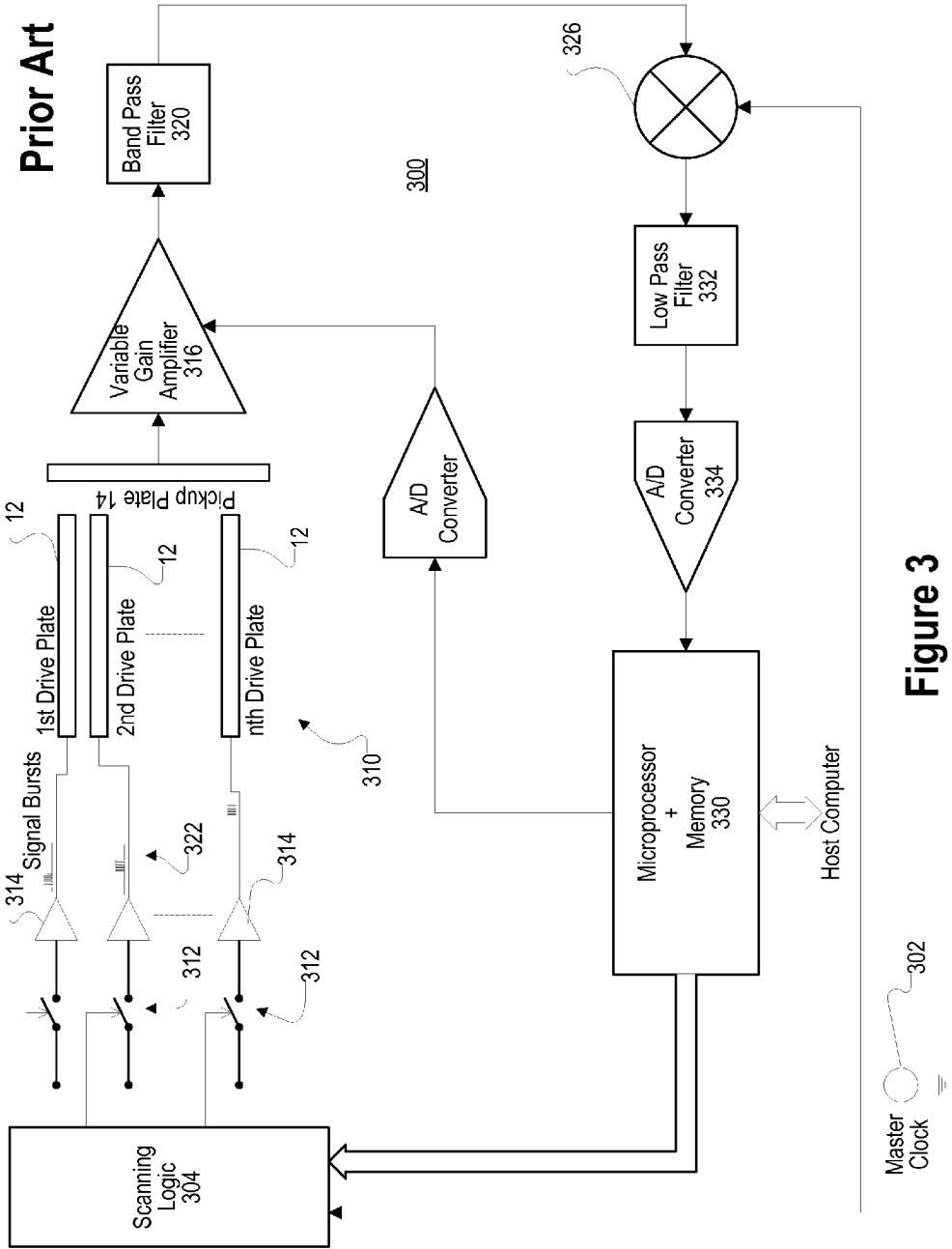
FIG. 3 shows a schematic and partly block diagram view of an existing circuit for employing the sensors of FIGS. 1, 2A and 2B, taken from U.S. Pat. No. 7,099,496.

According to aspects of embodiments of the disclosed subject matter methods and apparatus to improve capacitive image or location sensors, most specifically linear capacitive image sensors used in fingerprint sensors, are proposed. FIGS. 1-3, as noted above, are similar to or taken from those in U.S. Pat. No. 7,099,496, and illustrate the layout and operation of a linear capacitive image sensor 10. Such a linear capacitive array sensor 10 operates by activating a line of conductive drive plates 12 individually with a probing signal, and reading the resulting received version of the probing signals output on in a common pickup plate 14, as can be seen in FIG. 1. The electric field which is coupled across a gap between an active drive-plate 12 to the pickup-plate 14 defines an individual pixel location. The characteristics of the resulting pickup signal 20 will depend primarily on the impedance between the drive plates 12 and the pickup plate(s) 14 across the pixel location gap. The difference in impedance that is caused by whether a fingerprint ridge or valley is located within the pixel gap can be detected by differences in the pickup signal 20 and translated into an image or the ridge or valley at the pixel location for a given linear scan, a plurality of which make up the image of a fingerprint or at least a portion of such an image.

Existing linear capacitive sensors 10 operate by activating a line of conductive drive plates 12 individually in sequence, and reading the resulting pickup signals 20 received on a common pickup plate 14. The characteristics of the resulting pickup plate output signals 20 can depend on the impedance (primarily the capacitive impedance) between the drive plate 12 and pickup plate(s) 14 at each gap between them, each forming also a pixel location. An object that is close enough to change this impedance will affect the received signal on the pickup plate 14. In an embodiment, such as, is discussed here, e.g., a linear 1×n pixel array image sensor 10, intended for use in fingerprint imaging, the geometry may be arranged so that a finger surface located close to the gap between the respective drive plate 12 and pickup plate(s) 14 will cause a difference in impedance depending on whether a fingertip ridge or valley is located within the region of the gap defining a pixel location.

Therefore, as is known, the difference of a finger ridge or valley present over the gap forming the pixel location will result in detectable differences in the pickup plate(s) output signal 20. These in turn can be used to build an image of the portion of the finger close to the sensor array, i.e., a linear 1×n pixel array image forming part of the image of a fingerprint in one example. A line scan can be achieved by driving the drive plates 12 sequentially, one after the other, and a linear image of the finger surface can thereby be created. If a finger is swiped in a direction generally orthogonal to the line of pixel location gaps, multiple scans can be taken and arranged to create a full fingerprint image or at least a portion of the image.

A sequence of activation, as an example, involves successive groups of drive plates being activated, all with the same number of plates in the same pattern. Note that different groups may overlap and contain some of the same drive plates. As with the original sensor described above, the sequence does not necessarily require that adjacent groups follow each other: the sequence can involve any order of activation so long as the resulting data is organized as needed for analysis. When the data is organized, the signal levels of adjacent groups are compared. Note that adjacent groups are still only a distance P apart, as with the original image sensor described above. Thus, even though the size of a group is larger than W, the pitch between them is still P. Thus, the signal may be increased by proper grouping of the drive plates while not necessarily increasing the pitch. Since the signal level and device resolution are no longer directly coupled, it is possible to improve signal size at a given resolution compared to the method of activating the drive plates sequentially.

As a generalization, the resolution of such a linear sensor array 10 can be determined by the pitch, P, (distance from one point on a sensor drive plate 12 to the same point on another adjacent sensor drive plate 12 along the length of the line of the drive plates 12, as shown in FIG. 1. Resolution may be defined by the number of pixels per a given length, L (or resolution=P/L). The finger may not directly contact the drive plates, but may be separated from them by a distance, d, as can be seen in FIGS. 2A and 2B. This distance d may be, e.g., the thickness of a protective coating 32. The strength of signals and their changes due to changes in the finger surface at the individual pixel locations, will depend critically on the overall capacitance determined by the local geometry of the finger surface 30, the drive plates 12 and the pickup plate(s) 14. As d is increased, this capacitance coupling with the finger surface can be expected to decrease, resulting in an overall output signal reduction.

In FIG. 2A, a finger is located such that the ridge of the fingerprint is located over an active sensor pixel, i.e., at the culmination of the respective activated drive plate 12. The impedance between the drive plate 12 and pickup plate 14 is affected by capacitive coupling through this ridge. Primarily, the fingerprint ridge capacitively couples the respective drive plate 12 and pickup plate(s) 14. In FIG. 2B, the location of finger has moved, and now a valley is located over the active pixel of the sensor 10. Such a valley, i.e., mostly being air in the vicinity of the pixel location gap between the drive plate 12 and pickup plate 14, has a relatively higher capacitive impedance to the finger surface.

An embodiment of an imaging system 300, e.g., for imaging an object, such as a finger to obtain a fingerprint image, is shown schematically and in block diagram form in FIG. 3, taken from FIG. 3 in U.S. Pat. No. 7,099,496. The imaging system 300 may include an image sensing circuit 310, like that of which a portion is illustrated in FIG. 1. The system 300 may also include a microprocessor and memory 330. A master clock 302 can provide a clock signal to scanning logic, such as multiplexed ("mux") scanning logic 304 and mixer 306. Master clock 302 can operate over a range of frequencies, for example, 20 MHz-80 MHz, but is not limited to this range. The master clock can be used for timing by the sensing system 300. Microprocessor and memory 330 can be used to generate timing control signals for mux scanning logic 304, the outputs of which mux scanning logic 304 can serve as activation control inputs to switches 312. At the same time, the master clock 302 high frequency output pulses can form the probing signal, e.g., in the form of bursts 322 of the clock pulses lasting for a finite burst time. This form of the probing signal can then be transmitted to the respective drive plate 12 in the sensor circuit 310, when the respective switch 312 is closed, under the control of the microprocessor/controller 330 controlling the mux 304 to shut the respective switches 312 in an order controlled by the microprocessor/controller 330.

A low impedance buffer 314 can be utilized to activate each drive plate 12 with signal burst 322. The signal bursts 322 may be generated by standard circuit elements (not shown) known to those skilled in the art, e.g., derived from a common frequency reference of the master clock 302 signal, or comprise the output of the master clock 302 for some selected time period defining the temporal length of the respective burst 322. In one embodiment, as an example, the master clock 302 can operate at 40 MHz, and each switch 312 can be shut on for about 2-5 microseconds. The signal bursts 322 applied to the drive plates 12 can provide an energization of the capacitive coupling gaps between the respective drive plate 12 and the pickup plate 14 in the sensor element 310, i.e., between the end of the respective drive plate 12 and the pickup plate 14. Because the scan speed is large in comparison with the finger swipe speed, a line scan of the finger is produced.

One of skill in the art will appreciate that drive plates 12 need not be driven sequentially. In fact, the drive plates 12 may be driven in any order. Further, drive plates 12 need not be driven with bursts of pulses, such as bursts of pulses from the master clock 302 signal. The drive plates may transmit to the receiving pickup plate a variety of differing signals from which the capacitive impedance value across the respective pixel gap can be determined, as an example, with any periodic signal, such as a sine wave.

When the respective control input is activated, each switch 312 delivers a probing signal, e.g., from master clock 302, to the respective low impedance buffer 314. Signal burst 322 output by low impedance buffer 314 are then capacitively coupled to pickup plate 14 at the respective pixel location in the linear 1×n array formed by the drive plates 12 and the pickup plate 14. As discussed above, the capacitive coupling is a function of the fingerprint features passing over the sensor gap in the respective pixel location. When the input to switch 312 is not activated, low impedance buffer 314 can be configured to drive its connected drive plate 12 to ground.

A variable gain amplifier 316 may receive the present signal received on the pickup plate 14. The gain of a variable gain amplifier 316 may be controlled by the output of a digital-to-analog converter 318 connected to microprocessor and memory 330. The gain may be adjusted to provide a desired output level despite variable sensing conditions. The output provided by digital-to-analog converter 318 to variable gain amplifier 316 may result in a gain adjustment based on the impedance(s) of the particular finger being sensed. The signal output from variable gain amplifier 316 can be supplied to a band pass filter 320. Band pass filter 320, e.g., can be centered at the frequency of master clock 302 and may have a Q of, e.g., 10. The output of band pass filter 320 can then be multiplied in a mixer 326, also controlled by the clock signal from master clock 302. Mixer 326 performs synchronous envelope detection of signal bursts 312. The output of mixer 306 can be seen to form, e.g., a baseband pulse that represents an envelope of the capacitively coupled probe signal 322 signal burst at each drive plate 1–n, and, therefore, each pixel location. In an alternative embodiment, synchronous rectification may be used for envelope extraction.

The amplitude of the pulse output by mixer 326 can be seen to be a function of the present capacitive coupling impedance, and, therefore, also, the sampled topographic feature of the finger 30 at the given pixel location for pixels 1–n. The resultant pulse amplitude modulated signal out of the mixer 326 can then be supplied to a low pass filter 332. Low pass filter 332 can remove unwanted portions of the received probing signal 322, e.g., high frequency harmonics produced by the mixing process. Low pass filter 332 may also be configured to have group delay characteristics that compensate for phase distortions incurred in the previous signal processing stages. Low pass filter 332 may also be optimized for processing the information coming out of the mixer 326 at the rate at which the drive plates 12 are energized.

An analog-to-digital converter 334 can then convert the output of the low pass filter 332 to a digital value. Analog-to-digital converter 334 may have, for example, a resolution of 8 to 12 bits and can be, therefore, capable of resolving the output of low pass filter 332 into, in this example, 256 to 4096 bit digital representations of level. Analog-to-digital converter 334 can operate at a sufficient speed (e.g., 200 kilo-samples per second) to accommodate the scanned energization of the drive plates 12 of image sensor 310. Microprocessor and memory 330 can receive the output of analog-to-digital converter 334 and, e.g., store it in a memory, e.g., a line buffer or circular buffer. Each stored digital value represents the modification of the transmitted probing signals 322 based on the capacitive impedance between a respective pixel location drive plate 12 and the pickup plate 14 at the time when that drive plate 12 was energized by the respective probing signal burst 322. The capacitance, as noted, is modified by the finger feature that passed over the sensor gap at the respective pixel location at the time when the respective drive plate 12 was energized. As a result, each stored value represents a fingerprint feature sensed at the particular pixel location (drive plate 12 to pickup plate 14 gap) for a particular linear image scan of the finger by the sensor circuit 310. A plurality of such scans makes up the data used by the fingerprint imaging system of the present application to reconstruct the final image of the finger, forming the fingerprint image, or some portion of the final image of the finger.

As noted, the individual drive plates 12 and single pickup plate, as an example, form a linear capacitive array of 1×n pixel locations, i.e., from N=1 to N=n. It is not required, however, that the activation sequence consist of each drive plate 12 activation being followed by the activation of an adjacent drive plate, e.g., N=i followed thereafter by N=i+1 with a probing signal 22, 322 on the respective drive plate 12. The sequence can involve any order of activation so long as the resulting data for each pixel from pixel 1 to pixel n, i.e., for each gap between a drive plate from 1–n and the single (or perhaps dual) pickup plate(s) 14 is organized as needed for analysis. The data may, e.g., be stored in a circular buffer according to the proper pixel location in physical order as the pixel locations are sampled out of physical order, and then read from the buffer in order of place in the buffer corresponding to the physical pixel order.

Other arrangements can accomplish the same result, allowing for sampling out of physical order as desired, but ultimately arranging the data for fingerprint image reconstruction in the correct order associated with the correct location in each respective linear 1×n array scan being imaged. As noted, in some versions of these sensors, the pickup plate 14 may be replaced by two plates, as shown, e.g., in U.S. Pat. No. 7,460,697, and the probing signal which is received by each pickup plate is compared to form a single output representing the received probing signal 22, 322, e.g., by providing the two signals to a differential amplifier (not shown) the output of which represents a reduced-noise received probing signal. In still other versions, such as is shown in U.S. Patent App. Pub. No. 2009/0252386, the probing signal 22 may be placed on a common drive plate and individual pickup plates may form the pixel location gaps and be sensed for a respective pixel location output signal. However, the method and apparatus improvements described here are not intended to be limited to any of these specific types of sensor circuits 10, 310, e.g., the specific linear array sensor 10, 310, but may be applied generally to different designs of, e.g., both linear and area capacitive image or location sensors.

As noted, each drive-plate 12 to pickup plate 14 coupling defines an individual pixel location. The characteristics of the resulting pickup signal 20 will depend primarily on the capacitance between the drive plates 12 and pickup plates 14, or in an alternative embodiment (not shown) a single common drive plate 12 and individual pickup plates 14. When used as a fingerprint sensor, in the embodiment mostly discussed in the present application by way of example, the drive plates 12 and pickup plates 14 are co-planar and the finger surface 20 (as shown schematically in FIGS. 2A and 2B) is located a distance d from the plane of these plates 12, 14. The difference in capacitance that is caused by whether a fingerprint ridge or valley is located within the pixel location, as noted, is detected by differences in the pickup signal 20.

In some applications is it desirable to increase the distance d. As d is increased, however, the effect of the finger surface 30 on the capacitance in the respective pixel location gap forming the respective pixel and, therefore, the pickup signal 20 for the respective pixel will decrease. To increase the pickup signal 20, the general area of either of the plates 12, 14 can be increased. For drive plates 12 arranged in a linear fashion, increasing area is largely achievable by increasing the width W along at least some length of the sensor drive plate 12, near the pixel location gap with the pickup plate 14, as illustrated schematically in FIG. 1. However, increasing W can limit the minimum device pitch P and, therefore, reduce the maximum device resolution (pixels per distance, or L/P). Therefore, with this approach of increasing signal by increasing W, there is a trade-off between device resolution and received probing signal level. That is, increasing the received probing signal 20 output level to the imaging circuitry may require a decrease in resolution. This constitutes a significant problem that could limit the ability to increase d, e.g., as may be desired to, e.g., increase the height of a protective layer 32 above the plates 12, 14. Stated another way, this directly links the signal level of the output received probing signal 20 from the pickup plate 14 to the resolution of the device 10.

According to aspects of embodiments of the disclosed subject matter of the present application, methods and associated apparatus are proposed to reduce or eliminate this trade-off between resolution and the available level of the output signal 20 from the pickup plate(s). Applicants therefore propose, e.g., activating several drive plates 12 simultaneously to generate a single pickup plate output signal 20, i.e., for a single pixel location along the pickup plate 14. When several drive plates (herein referred to as a drive plate group 12') are activated together, their combined areas can be used and the capacitive coupling to the finger surface 30 and its effect can be increased. This can result in increasing: (1) the effect the finger surface 30 has on the impedance between this group of drive plates 12' and the pickup plate 14, and (2) the changes in the received probing signal represented by the pickup plate output signal 20 as the finger surface 30 changes. Those skilled in the art will appreciate that this same technique may be utilized in the possible alternative embodiment where there is a single common drive plate and multiple pixel location determining pickup plates, individually sampled for the respective pickup plate output signals 20 associated with the respective individual the pixel locations.

Different patterns of drive plates 12 can be activated to form the group 12', either as continuous group 12' of, e.g., j plates, i.e., drive plates 12, n=i through n=i+j that are activated, or with some separation between plates within the group, i.e., drive plates 12, n=1 through n=i+2j, with, e.g., every other drive plate 12 not activated with a probing signal 22, 322. The pattern for a group 12' of drive plates 12 that is used may be arranged to optimize the area and location of the coupling of the finger surface 30 to the respective pixel location gaps between the respective sensor drive plates 12 within the group 12' and the respective pickup plate(s), in order to achieve the desired signal level 20 on the pickup plate(s) 14 for a selected respective pixel location gap.

The sequence of activation can involve successive groups of drive plates 12 in successive groups 12' being activated, all with the same number of drive plates 12 in the same group 12' pattern, and the respective pixel location gap incrementing by 1 each separate activation. Note that different groups 12' will almost always overlap each other for respective adjacent pixel gap locations and contain at least some of the same drive plates 12. However, as with the original sensor 10 described above, the sequence does not necessarily require that adjacent groups follow each other in being activated. The sequence can involve any order of activation, such as a random order of activation, so long as the resulting pixel location data is organized as needed for analysis, as discussed above, for the respective pixel locations.

When the data is so organized, the pickup signal levels 20 of adjacent groups 12' corresponding to adjacent pixel locations can be compared. The respective pixel locations for the pixels, each represented by a particular group 12' of drive plates 12, for adjacent groups 12' of drive plates, are still only a distance W apart, as with the original image sensor described above. Thus, even though the size of a group 12' of drive plates is larger than W, the pitch between the represented pixel locations does not change and is still W. The received probing signal 20 received by the pickup plate(s) 14 may be thus increased by proper grouping of the drive plates 12 in the respective groups 12', without increasing the pitch of the sensor pixels. Since the pickup signal 20 level and device 10 resolution are no longer directly coupled, it is possible to improve pickup signal 20 size at a given resolution.

Attention may need to be paid to the fact that by increasing the size of the activated area one may increase the area of finger surface which contributes to the data collected for a given pixel location. This can also effectively decrease an image resolution as this finger area may overlap with that of the adjacent pixel(s). The pattern of drive plates in a group 12' may be chosen to optimize the trade-off between this lost resolution and desired pickup signal 20 level. The pattern used may be arranged to optimize the area and location of the coupling of the finger surface to the sensor plates to achieve the desired pixel definition. The sequence of activation of different groups 12' may also be chosen to impact this trade-off. Thus, the signal may be increased by proper grouping of the drive plates while not necessarily increasing either the pixel location effective size or the pitch. Since the pixel size, pitch and resolution are no longer directly coupled, it is possible to improve amplitude or the like of the pickup plate(s) output representing the received probing signal (in this case signals from various different drive plates activated at the same time within each group 12'). It will also be understood that other techniques for reduced noise and/or improved signal acquisition discussed in the art mentioned above and/or otherwise known in the art may be applied in the system and method of the disclosed subject matter as well. For example, combining or offsetting, spatially or temporally, differing drive signals, such as differing in phase, as is known in the art, may be applied to groups 12's of drive plates 12 or pickup plates 14 as discussed in the present application.

Figure 4:
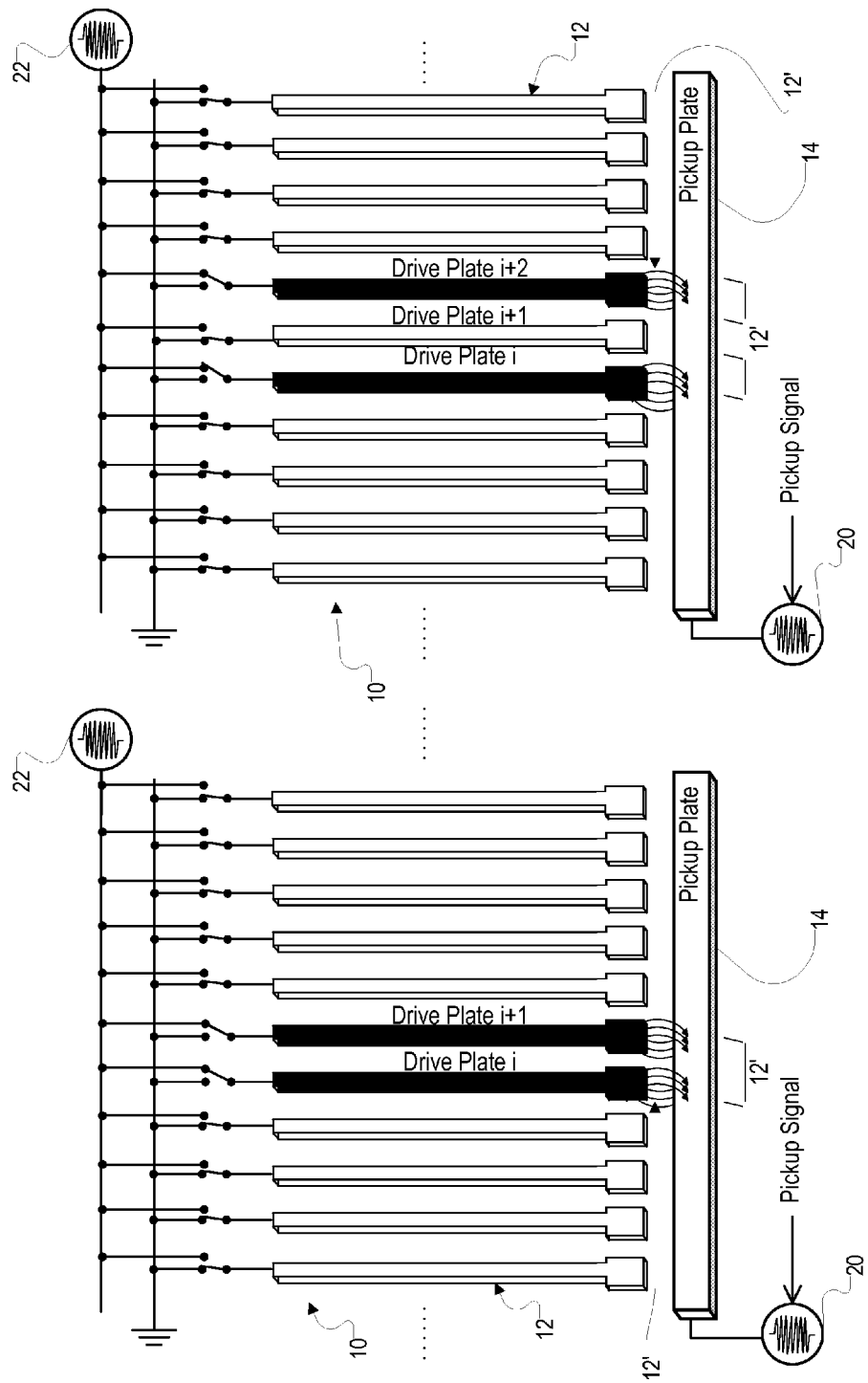
FIG. 4 shows schematically and partly in block diagram for a group of drive plates being energized at the same time with the probing signal according to aspects of embodiments of the disclosed subject matter.

Turning now to FIG. 4 there is shown a schematic and partly block diagram representation of an example of a group 12' of drive plates 12 activated simultaneously by the same probing signal 22. The pickup plate 14 provides an output signal 20 representative of the received probing signal 20 received at the pickup plate 14 from the group 12' consisting of, as illustrated and by way of example, adjacent drive plates i and i+1. The controller 330 may regard the output signal 20 as being from a single pixel location that may be, e.g., the gap between drive plate i−1, i, i+1 or i+2, as examples. As appropriate, the drive plate 12 leading to the gap at the pixel location, even if not energized, such as drive plate 12 i−1 or 1+2 can still be controlled to be connected to ground. The software or the like in the controller 330 can allocate the output signal 20 on the pickup plate 14 to that pixel location.

Figure 5:
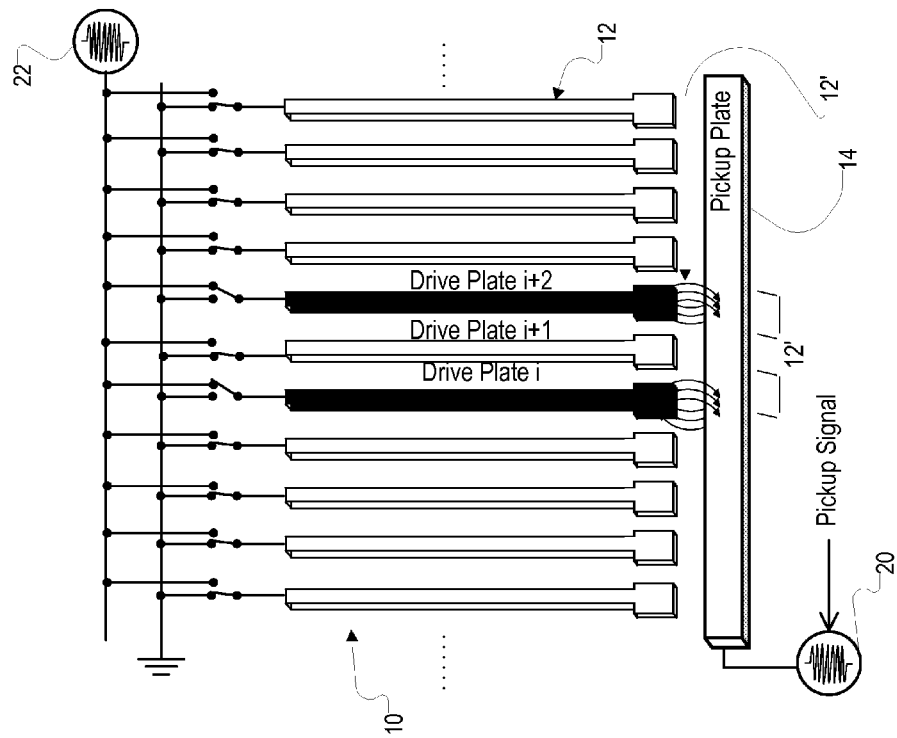
FIG. 5 shows schematically and partly in block diagram for a group of drive plates being energized at the same time with the probing signal according to aspects of embodiments of the disclosed subject matter.

Turning now to FIG. 5 there is shown a schematic and partly block diagram representation of an example of a group 12' of drive plates 12 activated simultaneously by the same probing signal 22. The pickup plate 14 provides an output signal 20 representative of the received probing signal 20 received at the pickup plate 14 from the group 12' consisting of, as illustrated and by way of example, drive plates i and i+2, which may be separated by an un-energized drive plate i+1. The controller 330 may regard the output signal 20 as being from a single pixel location that may be, e.g., the gap between drive plate i−1, i, i+1, i+2, or i+3 as examples. By way of example, the pixel location may be at the gap formed by drive plate 12 i+1, energized drive plates i and i+2 on either side forming a symmetric pattern on either side of the pixel location at drive plate i+1. As appropriate, the drive plate 12 leading to the gap at the pixel location, even if not energized, such as drive plate 12 i−1, i+1 or 1+3 can still be controlled to be connected to ground. The software or the like in the controller 330 can allocate the output signal 20 on the pickup plate 14 to that pixel location i−1, i+1 or 1+3.

Turning now to FIG. 6 there is shown a schematic and partly block diagram representation of an example of a group 12' of drive plates 12 activated simultaneously by the same probing signal 22. The pickup plate 14 provides an output signal 20 representative of the received probing signal 20 received at the pickup plate 14 from the group 12' consisting of, as illustrated and by way of example, drive plates i, i+1 and i+2 all adjacent drive plates, and not separated by any un-energized drive plate(s). The controller 330 may regard the output signal 20 as being from a single pixel location that may be, e.g., the gap between drive plate i−1, i, i+1, i+2, or i+3 as examples. By way of example, the pixel location may be at the gap formed by drive plate 12 i+1, energized drive plates i and i+2 on either side forming a symmetric pattern on either side of the pixel location at drive plate i+1. As appropriate, the drive plate 12 leading to the gap at the pixel location, even if not energized, such as drive plate 12 i−1 or 1+3 can still be controlled to be connected to ground. The software or the like in the controller 330 can allocate the output signal 20 on the pickup plate 14 to that pixel location, e.g., i−1 or 1+3.

Turning now to FIG. 7 there is shown a schematic and partly block diagram representation of an example of a group 12' of drive plates 12 activated simultaneously by the same probing signal 22. The pickup plate 14 provides an output signal 20 representative of the received probing signal 20 received at the pickup plate 14 from the group 12' consisting of, as illustrated and by way of example, drive plates i, i+1, i+2, i+3 or i+4 all adjacent energized drive plates, except for un-energized drive plate(s) i+2. The controller 330 may regard the output signal 20 as being from a single pixel location that may be, e.g., the gap between drive plate i−1, i, i+1, i+2, i+3, i+4 or i+5, as examples. By way of example, the pixel location may be at the gap formed by drive plate 12 i+2, with energized drive plates i and i+1 and i+3 and i+4, on either side, forming a symmetric pattern on either side of the pixel location at drive plate i+2. As appropriate, the drive plate 12 leading to the gap at the pixel location, even if not energized, such as drive plate 12 i−1, i+2 or 1+5 can still be controlled to be connected to ground. The software or the like in the controller 330 can allocate the output signal 20 on the pickup plate 14 to that pixel location, e.g., i−1, i+2 or 1+5.

Figure 8:
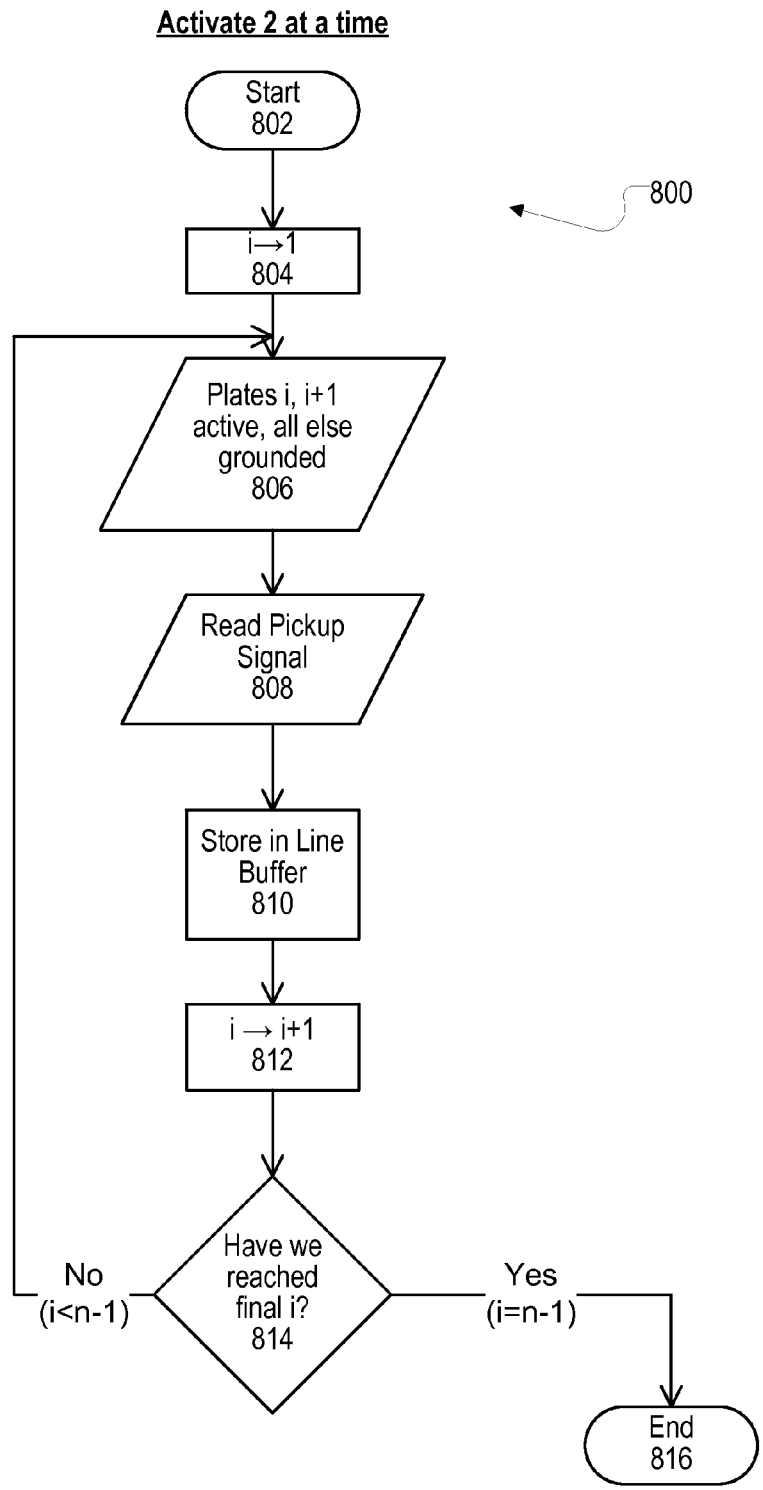
FIG. 8 shows a process flow for energizing a group of drive plates with the probing signal according to aspects of embodiments of the disclosed subject matter.

Turning now to FIG. 8 there is shown by way of example a process flow for energizing a group 12' consisting of 2 drive plates 12 according to aspects of embodiments of the disclosed subject matter. A process 800 may start at block 802, which in block 804 can set 1 equal to 1. In block 806 the process can activate drive plates 12 i and i+1, with all others grounded. In block 808 the process can read the output of the pickup plate 14. In block 810 the detected output signal value on the pickup plate 14 can be stored in a line buffer, associated with a selected pixel location. In block 812, i can be set to i+1. In block 814, a decision is made as to whether the process has reached ith drive plate, i.e., i<n−1, and if not the process return to block 806 and if so, i.e., i=n−1, the process stops in block 816.

Figure 9:
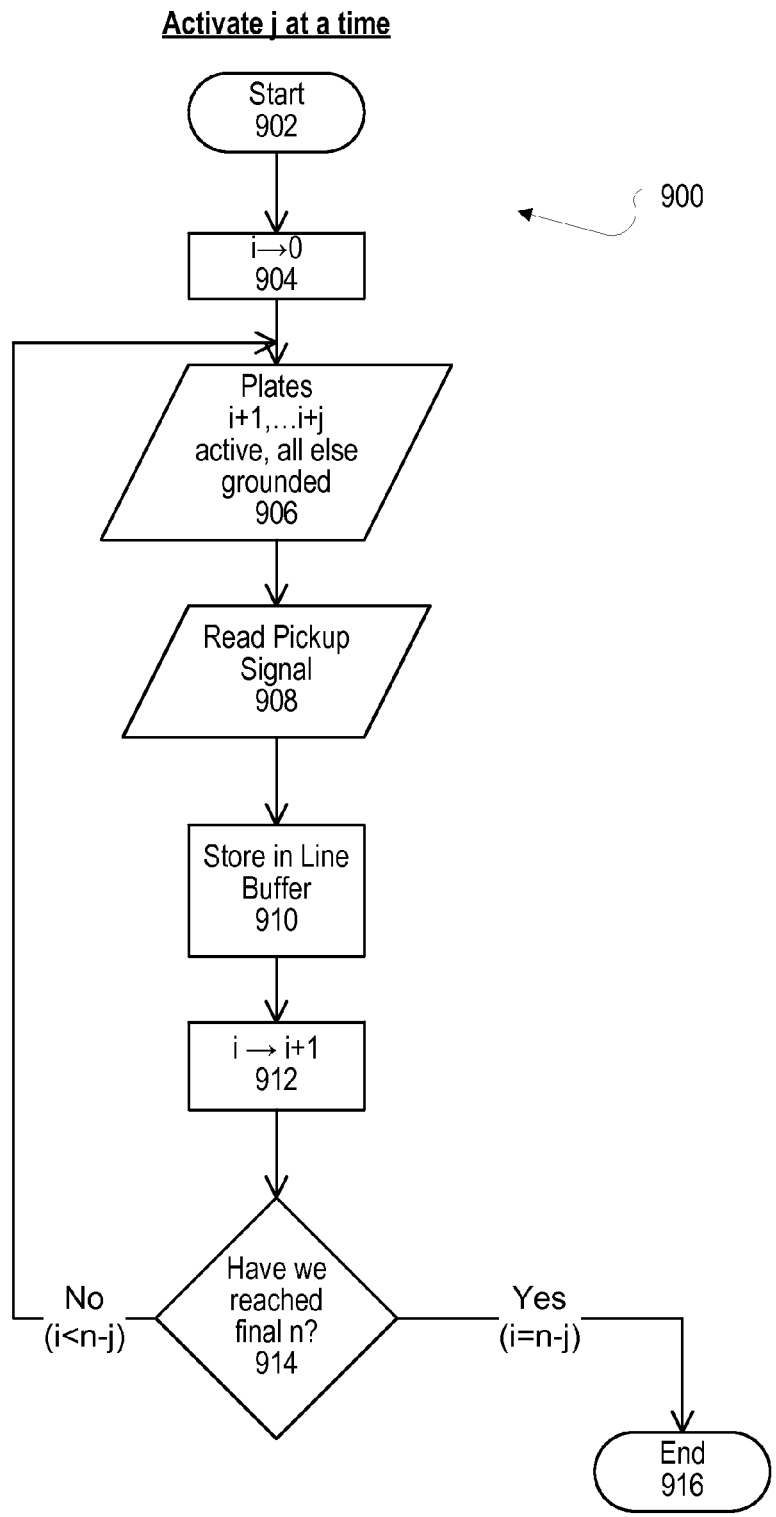
FIG. 9 shows a process flow for energizing a group of drive plates with the probing signal according to aspects of embodiments of the disclosed subject matter.

Turning now to FIG. 9 there is shown by way of example a process flow for energizing a group 12' consisting of j drive plates 12 according to aspects of embodiments of the disclosed subject matter. A process 900 may start at block 902, which in block 904 can set i equal to 0. In block 906 the process can activate drive plates 12 i+1 through i+j, with all others grounded. In block 908 the process can read the output of the pickup plate 14. In block 910 the detected output signal value on the pickup plate 14 can be stored in a line buffer, associated with a selected pixel location. In block 912, i can be set to i+1. In block 914, a decision is made as to whether the process has reached j drive plates, i.e., i<n−j, and if not, i.e., i=n−j, the process return to block 906 and if so the process stops in block 916. those skilled in the art will understand that FIGS. 8 and 9 deal with relatively simple energizing schemes that progress linearly across the drive plates, and that, with random energizing schemes, as discussed above, the process flow charts would be increasingly more complex.

Figure 10:
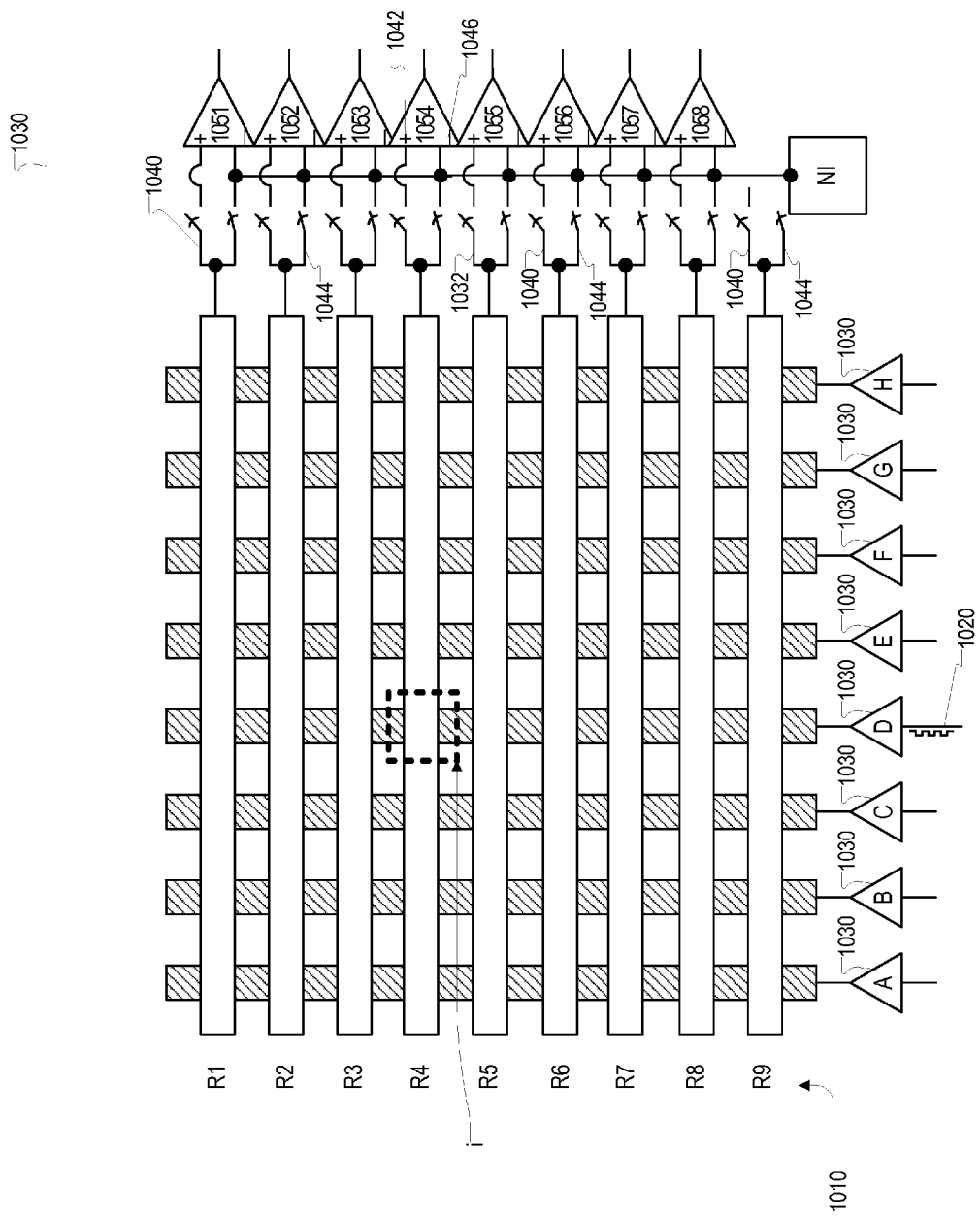
FIG. 10 shows an illustration in schematic form of a sensor array according to aspects of embodiments of the disclosed subject matter.

Referring to FIG. 10 an imaging array 1010, such as for biometric imaging, e.g., fingerprint imaging, which may comprise a grid pattern, by way of example, with columns labeled A to H and rows labeled R1 to R9 illustrates an example of a two dimensional fingerprint sensor array 1010 upon which a finger (not shown) may be placed. The illustrative example shows an 8×9 array, but arrays with other numbers of conductors A-H and R1-R9 are possible and typically more conductors are used. In addition larger arrays may also be formed by arrays 1010 such as illustrated in FIG. 10, with the 8×8 array of pixel locations forming a region of the overall array 1010.

As an example, for an array wherein the fingerprint area being imaged typically covers the entire array, there would be, an array of, as an example, 200×600 pixel locations. This may be typically, e.g., 10 mm across the width of the finger, i.e., 200 pixels wide and with a resolution of 20 pixels/mm. This equates to 508 DPI. The same pitch can separate the pixels in the 2D array forming the 600 pixel locations in the longitudinal direction along the length of the finger corresponding to the 200 wide pixel locations laterally. In a one dimensional linear array the 200 pixel locations would generally lie perpendicular to a direction of swiping for such a swiped sensor. The pitch may be chosen to be approximately less than half of the typical ridge/valley pitch of a fingerprint.

Circuits A-H drive probing signals 1020, e.g., RF pulse trains, e.g., having an RF carrier pulse rate, are shown below the array 1010 and circuits receiving response signals corresponding to each receiver plate R1-R9 are shown to the right of the array. The array 1010 thus consists of two sets of conductors, as an example, R1-R9 and A-H, defining intersection points, pixel locations, i, which may be separated by and surrounded by insulating dielectric material(s) (not shown), at least at the intersection points i, and perhaps also including intervening air. Probing signals 1020, e.g., radio frequency pulses, may be separately, e.g., sequentially, driven onto the set of column driver/transmitter/probing conductors, A-H, by the drivers 1030 A-H shown below the array 1010 in FIG. 10. The drive conductors (drive plates) A-H are intersected by the set of row conductors, i.e., receiver plates, 1-9. At each intersection point i between a drive plate conductor A-H and a receiver plate conductor 1-9, there is an electric field established between the conductors through the intervening and surrounding dielectric, including, perhaps, air.

Charge is coupled from the drive plate conductor A-H to the respective receiver plate conductor 1-9 through this field at the respective intersection point i. The field and thus the amount of coupled charge is affected by the presence of a biometric, e.g., a fingerprint on a finger, in the vicinity of the pixel location, e.g., touching a dielectric layer over the pixel location i. Even more particularly this is affected by whether there is a ridge or valley of the fingerprint over the intersection point i, i.e., the pixel value for that point in the fingerprint image being sensed.

If a fingerprint ridge is present over the intersection point i, as opposed to a valley, the ridge contacts the sensor grid, or at least contacts or nearly contacts some protective layer, such as a dielectric layer(s) over the pixel location at the intersection point i, and part of the field which would have gone from the respective drive plate conductor, e.g., D, as in the illustration of FIG. 1, directly to the respective receiver plate conductor, e.g., 4, in the illustration of FIG. 1, goes from the probing conductor D plate to the ridge and from the ridge to the receiving conductor 4. This is illustrated in FIG. 16.

Figure 14:
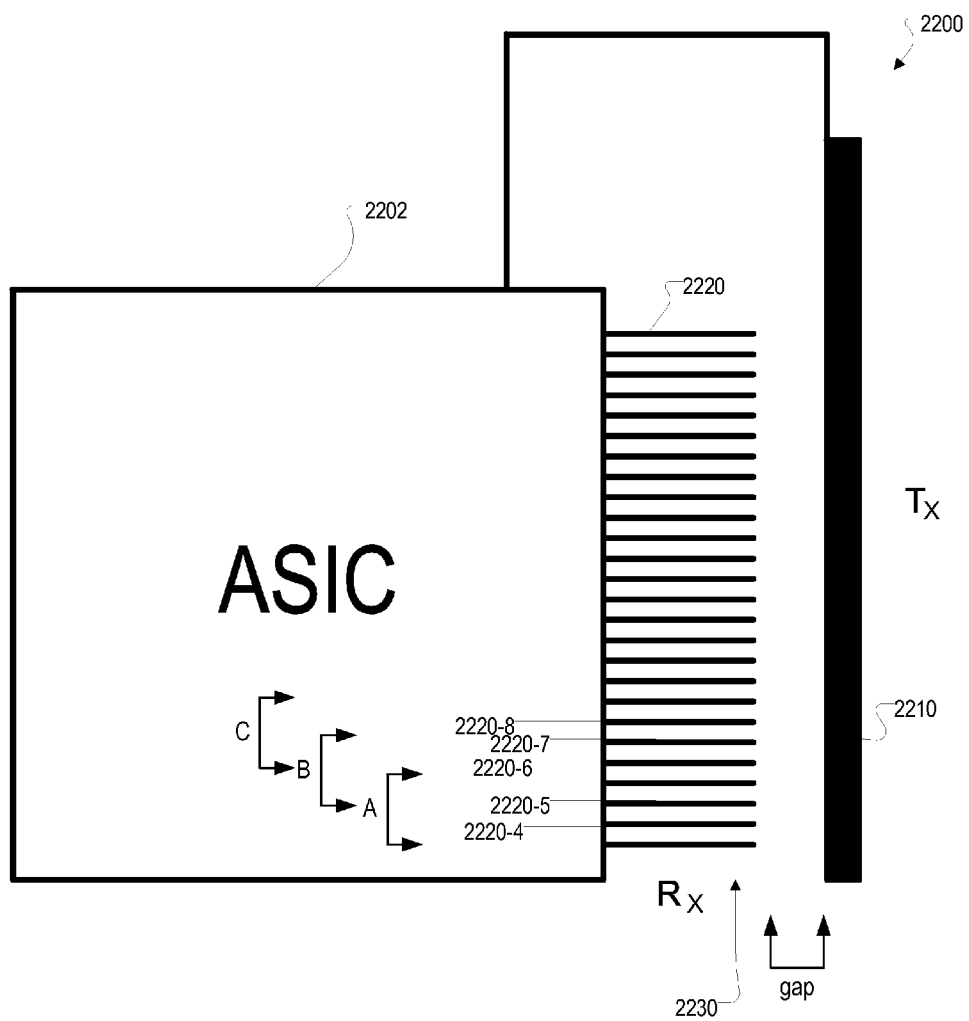
FIG. 14 shows an illustration in schematic form of an alternate embodiment of a sensor array, according to aspects of embodiments of the disclosed subject matter.
Figure 16:
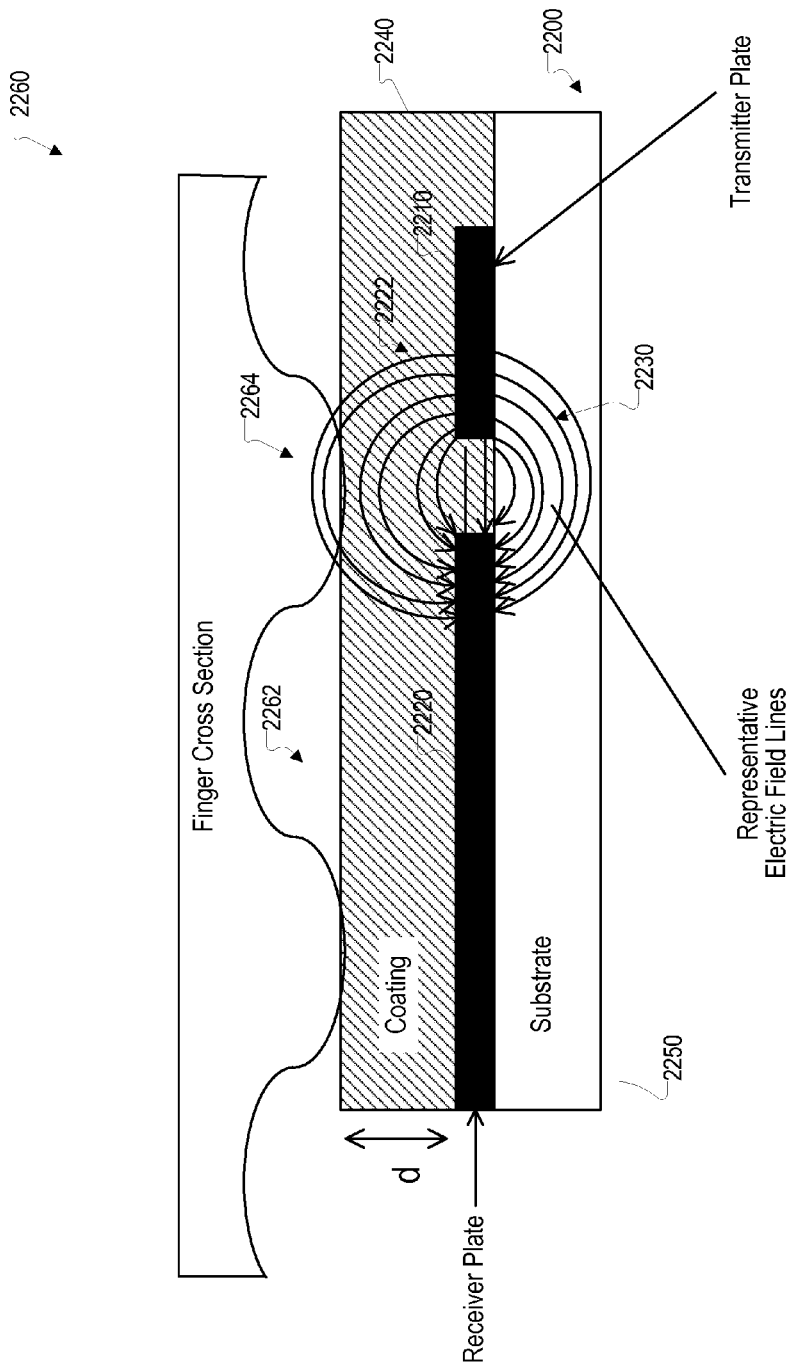
FIG. 16 shows an example in cartoon form of an electromagnetic field across a capacitive gap influenced by a biometric having a particular feature in the vicinity of the gap, according to aspects of embodiments of the disclosed subject matter.

In FIG. 16 for a linear one dimensional capacitive gap array sensor, such as 2200 shown schematically in FIGS. 14 and 16, the drive signal, such as an RF pulsed AC signal, creates a fluctuating electromagnetic field 2222, i.e., an RF fluctuating electric field, across the gap 2230 (1230 in FIG. 14) between the drive plate transmitter 2210 (1210 in FIG. 14) and the receiver plate 2220 (1220 in FIG. 14). It can be seen that the electromagnetic field 2222 extends through a protective coating 2240 covering the gap 2230 between the drive plate 2210 and the receiver plate 2220 and into a ridge 2264 on the finger 2260 placed on the sensor 2200. As is known in the art, this modifies or modulates the received response signal received on the receiver plate 2220 (1220 in FIG. 14) responsive to the transmitted signal from the drive plate 2210, and does so differently than if a valley 2262 were in the same position relative to the pixel location at the gap 2230 in between the drive plate 2210 (1210 in FIG. 14) and the receiver plate 2220 (1220 in FIG. 14).

As the finger, 2260 in FIG. 16, may be treated as a grounded conductor, in reference to the 2d array illustrated in FIG. 10, the charge coupled from the drive plate conductor D, in FIG. 10, through this part of the field 2222, as illustrated in FIG. 16, is dissipated into the finger 2260, as illustrated in FIG. 16, and is not coupled into the receiving conductor R4, resulting in less charge being coupled from the probing conductor D to the receiving conductor R4 and, therefore, less response signal 1032 received on the respective receiving conductor R4 and applied to the positive terminal 1042 of the respective differential amplifier 1054, in FIG. 1. This difference in response signal 1032 between ridge and valley is referenced in the present application as a modulation of the respective transmitted drive signal 1020. The constant part of the response signal 1032 is the received RF pulse carrier rate from the drive signal 1020.

Referring to a 2D array, as shown in FIG. 10, to sample the entire fingerprint image, the response at each intersection point i (pixel) is sampled. Each pixel i in the array 1010 may be sampled, one at a time, until all of the pixels i of the array 1010 have been sampled. To sample a pixel, i the corresponding driver plate, e.g., A-H is energized to transmit the RF drive signal 1020, sometimes referred to as a probing signal 1020, from the respective one of the drivers 1030A-H, i.e., 1030 D for pixel location i, and the corresponding respective receiver plate R1-R9, i.e., R4, receives a modified version of the transmitted drive signal. A characteristic of the response signal 1032, e.g., the amplitude and/or phase, of the response signal 1032, coming from each receiver plate R1-R9, e.g., into the plus terminal of the receiver differential amplifier for receive row R4, is then measured to detect variations in the received response signal to differentiate between a ridge and valley at that pixel i location.

Simple single-ended amplification and measurement of the received response signal 1032 may be utilized, but with some undesirable effects. First, since the finger acts as a conductor, it may pick up electrical noise from the local environment and couple this noise into the receiver plate conductors R1-R9. This may degrade the quality of the received response signal 1032 and thus the quality of the ultimately produced fingerprint image (not shown). Second, the amplitude of the modulation can be much less than that of the received carrier. This can limit the amount of gain that may be applied to the response signal 1032 during signal processing to measure the alteration of the received response signal vis-à-vis the transmitted drive signal. The response signal may be amplified up to the limit of the receiving amplifiers, e.g., as show in FIGS. 12a-c. However, since the received response signal is mostly carrier, and the modulation is a small component of the received response signal, after amplification (FIG. 12b), the modulation (FIG. 12c) may still be at relatively low amplitude, i.e., a relatively minor portion of the received response signal. Since the modulation is the part of the signal which is of interest in the creation of the fingerprint image, i.e., defines whether a valley or ridge is at the pixel location i being sampled, this needs to be able to be amplified to a usable level.

To solve these problems, a differential amplification scheme can be utilized, e.g., as discussed in U.S. Pat. No. 7,099,496 referenced above, however, with a single receive plate and multiple drive plates, which patent is also assigned to the assignee of the present application. However, in the present case, certain improvements to such differential amplification are provided, as depicted by way of example in FIG. 10. Using the sampling of pixel D4 as shown as an example, the active circuits and conductors in FIG. 10 are the driver 1030D and its input 1020 and differential amplifier 1054 and its positive input and the negative inputs to the remainder of the differential amplifiers 1051-1053 and 1055-1058, with the remainder being inactive circuits and conductors. Driver 1030 D drives the probing signal 1020 onto drive plate conductor D. Switches 1040 connected to the respective receiver plate conductors R1-R9, i.e., D4 in the case of pixel location i, is set to connect receiver plate conductor R4, the finger input ("FI"), to the positive input 1042 of receiving differential amplifier 1054, and switches 1044 to connect all 8 other receiver plate conductors, e.g., R1-R3 and R5-R8 to a common noise input rail "NI," which in turn connects to the respective negative input 1046 of all 8 receiving differential amplifiers 1051-1053 and 1055-1058. The receiver plate conductor R9 serves to connect to the NI negative input rail (noise input rail NI), but does not connect to a corresponding differential amplifier. As further explained below, according to aspects of the disclosed subject matter, this extra receiver plate conductor 9 can be included, e.g., to balance the coupling vs. loading of FI inputs vs. NI inputs.

Considering the noise problem there are two nodes in the system 1010: receiver plate conductor R4 (FI), and, in the example of FIG. 10, the 8 other receiver plate conductors (the NI node) which are shorted together by the closed switches 1044 from all of the other differential amplifiers 1051-1053 and 1055-1058. Although the NI node has 8 times the area, and thus 8 times the noise may couple into the NI node, the NI node also has 8 times the parasitic and functional loading. FI connects one receiver plate conductor R4 to one open switch 1044 and one closed switch 1040, i.e., to the positive input 1042 of one differential amplifier, i.e., 1054. The NI node connects 8 receiving conductors R1-R3 and R5-R9 to 8 open switches 1040, 8 closed switches 1044 (i.e., except for the input to the negative terminal 1046 of the differential amplifier 1054), and 8 differential amplifier negative inputs (i.e., for all but the negative input terminal of the differential amplifier 1054). This equates to exactly 8 times the loading of the FI node, i.e., being connected only to the positive terminal 1042 of the differential amplifier 1054.

Figure 11:
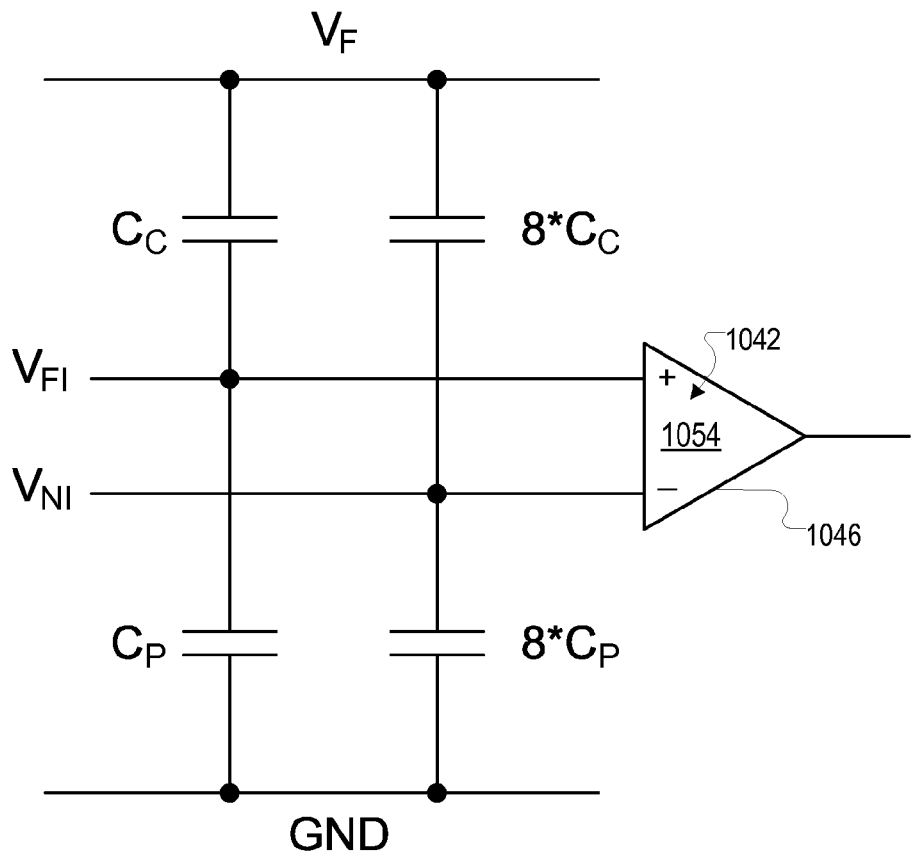
FIG. 11 shows an illustration in schematic for of a sensor output circuit according to aspects of embodiments of the disclosed subject matter.

Considering the loading of FI to the common voltage, e.g., ground ("GND"), as capacitive, i.e., CP, as shown in FIG. 2, then the loading of the NI node to GND is 8*CP. The coupling capacitance of the finger to FI being CC, then the coupling capacitance of the finger to the NI node is 8*CC. If the noise voltage in the finger is VF, then the FI and NI nodes form capacitive voltage dividers between the finger and GND as shown in FIG. 11. The input noise voltage on FI, VFI=VF*CC/(CC+CP). Likewise, the input noise voltage on the NI node being input to the negative terminal of the differential amplifier 1054, VNI=VF*(8*CC)/((8*CC)+(8*CP))=VF*CC/(CC+CP)=VFI. Therefore, the noise voltages on the FI node, input to the positive terminal 1042 of differential amplifier 1054, as the example, and on the NI node, input to the negative terminal 1046 of differential amplifier 1054, are equal and any noise coupled from the finger can be thus cancelled.

Considering the modulation amplification problem, the transmitted drive signal 1020 from the drive plate conductor D couples into both the FI node conductor D and the NI node conductors at each pixel location i along conductor D (i.e., R1-R9). Considering the signal coupled at each pixel location i along D to be composed of a carrier signal charge, QC, that is the same at each pixel location i, and a modulation signal charge, QM, that varies by pixel location i, the total charge coupled at each pixel location i is the sum of the carrier and the modulation, QC+QM. Therefore, as shown in FIG. 10, the coupling into the FI node is QFI=QC+QM(D4), and the coupling into the NI node is QNI=8*QC+QM(D1)+QM(D2)+QM(D3)+QM(D5)+QM(D6)+QM(D7)+QM(D8)+QM(D9)=8*(QC+average(QM(D1,2,3,5,6,7,8,9))). The voltage coupled into the FI node, VFI=QFI/CP=(QC+QM(D4))/CP. The voltage coupled into the NI node, VNI=QNI/(8*CP)=(8*(QC+average(QM(D1,2,3,5,6,7,8,9))))/(8*CP)=(QC+average(QM(D1,2,3,5,6,7,8,9)))/CP. The receiving differential amplifier, e.g., 1054 amplifies the difference between the signal on the FI node and on the NI node. This differential input signal is VIN=VFI−VNI=((QC+QM(D4))/CP)−((QC+average(QM(D1,2,3,5,6,7,8,9)))/CP)=(QM(D4)−average(QM(D1,2,3,5,6,7,8,9)))/CP, cancelling out the carrier and also a constant part of the modulation. This cancelling of the constant part of the signal enables a higher amplification to be applied to the remaining signal, which is now only the modulation component of the signal. What is amplified is the difference between the signal coupling at the respective pixel and the average signal coupling of the rest of the pixels along the same drive plate conductor D.

Since the part of fingerprints relevant to identification have ridges and valleys that tend to curve, and are not straight for long distances, the pixels along each drive plate conductor will tend to have a mix of ridges and valleys, and so the average modulation along each drive plate conductor will also tend to be similar, and the subtraction of this average from the pixels along each drive plate conductor will not significantly degrade the signal quality when comparing the pixels along one drive plate conductor to the pixels along another. The resultant signal is a double sideband suppressed carrier signal. Synchronous detection can then be used to enable demodulation of this signal.

Since the finger (2260 in FIG. 16) rests on or swipes a main sensor area, the finger 2260 is assured to maintain good contact with the active NI lines (in a swiped linear array device, e.g., the contact is maintained by different portions of the finger being swiped over the linear array) and so it will provide the same noise signal as the FI line, which due to the differential amplification, can cancel the noise. Since the system and method uses the main sense area, each active NI line receives the same carrier signal as the FI line and, therefore, due to the differential amplification, the carrier signal can be cancelled, again leaving just the modulation, and enabling more gain to be applied, and also reducing or eliminating the need for high pass filtering or carrier suppression. This may be Implemented while maintaining matching parasitics between the FI and NI paths, as noted above.

This sensor and method according to aspects of the disclosed subject matter thus, e.g., provides an approach(es) to reduction of signal noise contributions through differential signal processing. In a fully differential system, two inputs, a positive and a negative, are subtracted. The difference between them is the desired signal. Such differential systems work well for noise cancellation when the same noise appears on the positive and the negative terminals. When one is subtracted from other, the noise cancels and is removed from the output.

For a biometric, e.g., fingerprint, imaging sensor such as of the type mentioned above, most of the noise problems come from the finger. The finger carries with it noise from the environment that can be injected into the sensor. According to aspects of the disclosed subject matter, positive and negative receivers should be defined such that same amount of finger noise is gathered on each side so that when the positive and negative terminals are subtracted from each other, the noise is cancelled.

With an array of receivers, either in a 2D array, e.g., as illustrated in FIG. 10 or in the a linear one dimensional array, as illustrated in FIGS. 1, 2A, 2B, 5-9 and 14-16, as defined in this application, with, e.g., 200 receivers, numbered 1 to 200, e.g., in a linear array, (or in a single row of a 2D array) the desire is to collect pixel information at a single receiver, 2220-6, for example, as shown by way of illustration in FIG. 14. In order to do this, receiver plate 2220-6 is first connected to the positive input of the respective differential amplifier (i.e., either one for a common receiver plate for a one D linear array or for a respective receive plate for a row, such as R4 in FIG. 10. Then, it is desirable to connect to the negative terminal something that will carry the same noise as receiver 2220-6, which at first glance might be thought to be the adjacent receiver plate, in this case 2220-7. Since they are close together, the noise would be the same or similar. However, since they are close together, the signal (i.e., whether there is a ridge or valley near them) will also often be the same or similar so that the subtractive output will be zero or nearly so, no matter whether a ridge or a valley is present, which means essentially all output would indicate the presence of a valley, which is not a useful set of outputs.

What is really needed for the negative terminal is something that can pick up the same noise as is on the receiver plate conductor 2220-6, or relatively the same noise, but can not mimic the signal that is trying to be detected from receiver 2220-6. A solution according to aspects of embodiments of the disclosed subject matter can be, by way of example, for the input to the negative terminal, a tie-in of all the other receiver plates, except 2220-6, can be used, i.e., all other receiver plates shorted together to the same negative terminal of the differential amplifier for the output of pixel location 2220-6. In other words, on the positive input to the differential amplifier there can be placed the response output on receiver plate 2220-6 and on the negative side the combination of the signals on the outputs on all other receiver plates, e.g., 2220-3-2220-5 and 2220-7-2220-10. This works at least in part, e.g., because the signal is an average of all the detected ridges and valleys for the finger or at least in a portion of the finger.

That is, this signal, when all of the other receiver plates are tied together, includes some of them that are detecting the altering effect of a ridge in the pixel location and some of them are detecting the altering effects of a valley at the pixel location. What is actually seen with all of the negative terminals tied together, or all of the negative terminals in a portion or area of the finger, is the average of all the ridges and the valleys. In other words, the negative terminal will not have ridge data and it will not have valley data, it will have an approximate average, and the average will mostly be right in the middle of the ridge/valley levels because most of the time there exists in the image (or portion of the image) being sensed just as many ridges as valleys. Putting an average value on the negative terminal of the differential amplifier has been found to be effective in noise reduction in a fully differential system.

As to the noise signal, importantly in a differential system, the noise should be the same on the positive terminal (receiver 26 in this case) and the negative terminal (receivers 1-25 and 27-200 in this case). Therefore, if the negative plate is effectively 199 times as large as the positive plate, it is difficult to imagine not possibly gathering exactly the same noise, and thus the larger plate would seem to pick up 199 times as much noise? However, it will pick up 199 times as much noise, but when all of the receivers are tied together, it is done in such a way that the negative terminal also has 199 times as much loading inside the chip. By way of example, this loading reduces the magnitude of the noise. Thus the noise is 199 times stronger due to the plate size (number of plates used in the collection), but it's 199 times weaker due to the loading. The effects cancel and one is left with the same amount of noise on the negative plate as is on the positive plate, generally speaking. Such a system and method can also be used for a 2D sensor.

Figure 12:
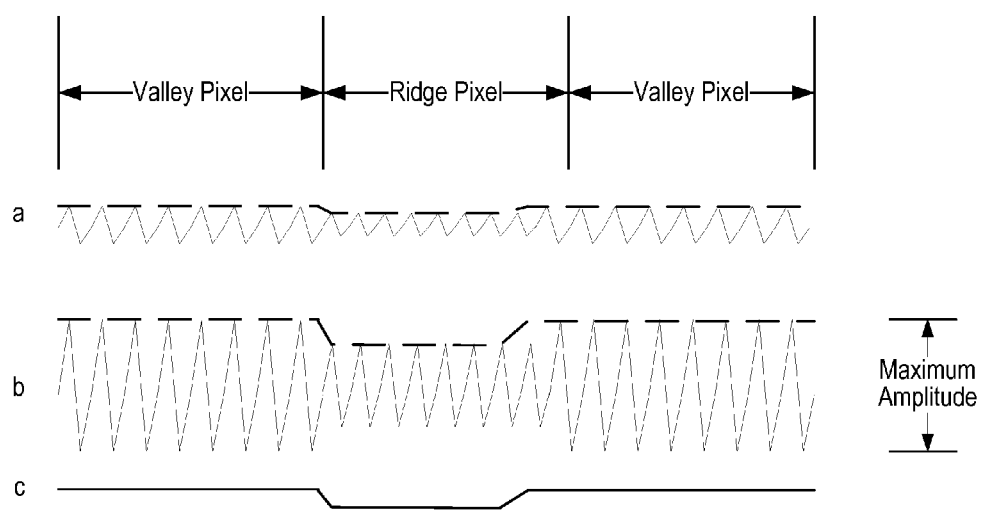
FIG. 12 shows an illustration of the waveforms involved in the sensor circuits without noise reduction, according to aspects of embodiments of the disclosed subject matter.

Turning to FIGS. 12*a-c*, there is shown in FIG. 12*a* a representative response signal, e.g., applied as a FI finger input signal to an amplifier, sequentially from different pixel locations, without noise reduction. The signal represents a response to the square wave AC pulses of the RF drive signal, across a capacitive load, i.e. increasing the voltage in the capacitor, e.g., across the gap or in an active 2D pixel location according to the RC response for the given capacitive load. In the ridge area, there is more capacitive coupling through the finger ridge and thus less impedance and a higher peak amplitude in the voltage curve and in the valley area, the capacitance rises due to the presence of air in the capacitor, resulting in a lower peak amplitude. Removing the drive signal, i.e., suppressing the carrier portion of the signal to obtain the constant part of the drive signal, as shown in FIG. 12*c* gives a signal with not a great deal of difference between the ridge pixels and the valley pixels.

Figure 13:
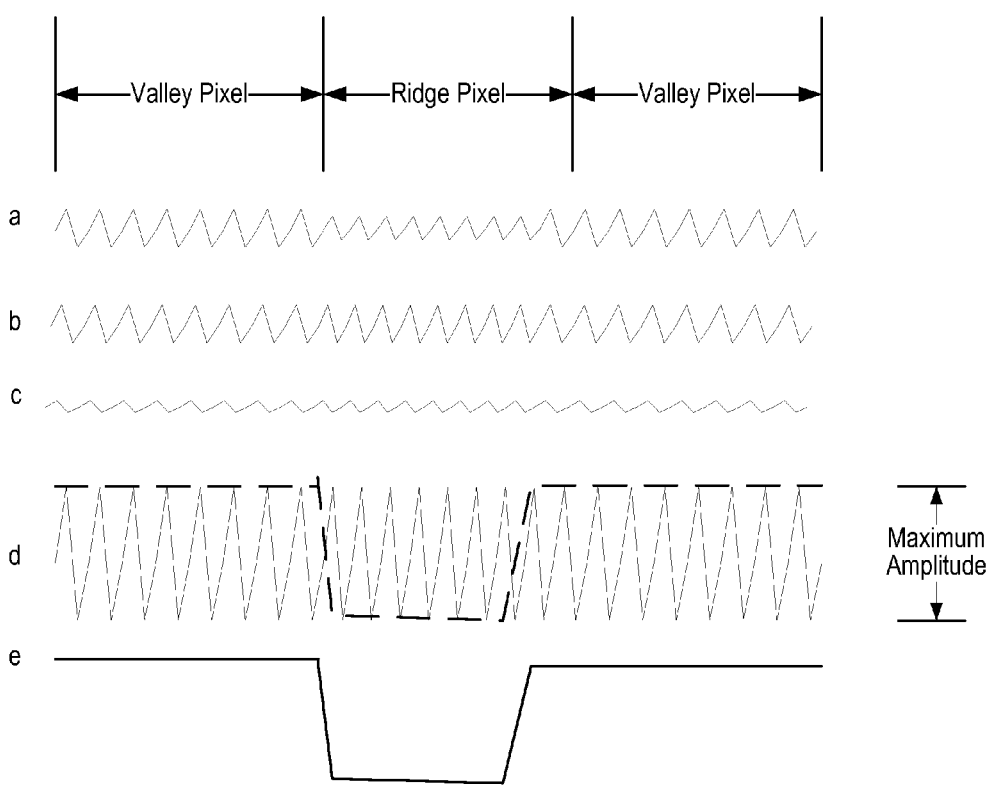
FIG. 13 shows an illustration of the waveforms involved in the sensor circuits with noise reduction, according to aspects of embodiments of the disclosed subject matter.

FIGS. 13*a-e* show representative signals indicating the effects of noise cancellation. The response FI signal shown in FIG. 13*a* can have subtracted from it an average noise signal such as is shown in FIG. 13*b*, resulting in the output signal from the differential amplifier(s) for valley and ridge pixels as shown in FIG. 13*c*. When this signal output of the differential amplifier is amplified again, as shown in FIG. 13*d*, and the carrier suppressed, as shown in FIG. 13*e*, the resultant signal differentiates much more distinctly between valley pixels and ridge pixels.

Grouping receivers can also be utilized, though with some possibly detrimental implications, e.g., with groups A, B, and C, e.g., as illustrated by way of example only, in FIG. 14. For example, if one uses 3 receivers in a group, these three receivers would be tied together to the positive terminal of the differential amplifier, and then some way would need to be found to balance the loading inside the chip such that either (a) the group of 3 receivers have 3 times the load and the 197 receivers on the negative terminal have 197 times the load, or (b) the group of 3 receivers on the positive terminal have 1 times the load and the other 197 receivers on the negative terminal have 197/3 times the load. Option (a) should be easier to implement.

According to aspects of the disclosed subject matter, a linear, i.e., one dimensional, capacitive gap image sensor and the methods of use are also disclosed. Related examples of such sensors are described in U.S. Pat. No. 7,099,496 and related successor and subsequent patents, all assigned to the assignee of the present application, the disclosure of which is hereby incorporated by reference for all purposes, as if the disclosure, including the FIGS. of the patent were repeated verbatim in the present application. In U.S. Pat. No. 7,099,496, a fingerprint image sensor is described which includes an image sensor, a rate sensor and a sensing circuit. The described image sensor in U.S. Pat. No. 7,099,496 is an example of a linear, one dimensional, capacitance gap sensor which is of the type also discussed in the present patent application. As discussed elsewhere in the present application, however, the improvements and concepts discussed in the present application are not limited to one dimensional linear capacitive gap sensors, but can apply to other capacitive arrays, such as two dimensional arrays.

In regard to such a linear, one dimensional capacitive gap array, a specific problem addressed by the present application includes improvement to the signal level from a capacitive fingerprint sensor, particularly as to one sensing, e.g., the finger through a layer(s) of dielectric material. Also addressed, however, is the more general issue of improving the signal, or signal to noise ratio, of a fingerprint sensor output. While described here in terms of a linear sensor that typically images a finger that swipes across it, as discussed in the above referenced patent, many of the apparatus and methods and concepts devices described here can apply to area, e.g., 2D sensors as well, and sensors that can be used to image either fingerprints or other stimuli, or be used to track locations or movements of stimuli, such as for GUI input cursor positioning, movement and icon selection.

FIG. 14 illustrates a basic layout of a biometric sensor 2200 according to aspects of the disclosed subject matter and similar to the systems and methods disclosed in the above referenced patent. An integrated circuit, such as, an application specific integrated circuit ("ASIC") 2202 can serve to drive a transmitter plate, $T_x$, 2210 and to also read the response signal on the receivers plates, Rx, 2220, and may contain other circuitry, e.g., scanning logic, amplifiers, ADCs, DACs, filters, a micro-processer(s), memory, and other components as needed to operate the disclosed system and method. The transmitter plate 2210 and receiver plates 2220 can be fabricated from any number of conductive materials such as metals (e.g. copper), transparent conductors (e.g. indium tin oxide ("ITO") or Poly(3,4-ethylenedioxythiophene) ("PEDOT"), or other suitable materials such as other conductive polymers.

These conductive components 2210, 2220 typically could be co-planer and located on a substrate, such as a flexible substrate, as is well known in the art, though the disclosed subject matter can address sensors with multi-level or 3-dimensional sensor traces, including sensors with 2D arrays as well. The disclosed subject matter can also include, as illustrated by way of example in FIG. 14 the multiple receiver plates 2220, which terminate near the transmitter plate 2210, e.g., forming a gap 2230 between each receiver plate 2220 and the transmitter plate 2210.

A signal, such as an RF pulsed signal, can be broadcasted via the transmitter plate 2210, and each of the receiver plates can detect a signal received from the transmitter plate 2210, which may be done in a defined sequence or simultaneously.

This received pickup signal can be seen to be dependant on the total impedance across the gap 2230 between the transmitter plate 2210 and the specific receiver plate(s) 2220 which are addressed. The region of space immediately surrounding the gap between the end of the respective receiver plate 2220 and the transmitter plate 2210 defines a "pixel" location used to sense and then assemble the biometric image, such as the fingerprint.

The impedance between the transmitter plate 2210 and the addressed receiver plate(s) 2220-XX can be modified by a change of materials in this "pixel volume" across the respective gap 2230. When used as a fingerprint sensor, as illustrated, the amount by which a pixel's impedance is modified will depend on whether the finger tissue in this pixel location is a ridge or valley of a fingerprint. This may also be understood as the presence of the ridge or valley in the gap, for the given pixel, modifying the electric fields surrounding the gap between the transmitter plate 2210 and the respective receiver plate(s) 2220-XX, due to the finger ridge or valley interacting, usually quite differently, with the respective electric field(s).

Even more descriptions of such interaction can be applicable. For purposes of understanding the disclosed subject matter, it is sufficient to understand that the drive signal on the transmitter plate 2210 is received on the respective receiver plate(s) 2220-XX in a modified (modulated) form, which can be used to detect differences in the modification (modulation) due to the presence of a ridge, a valley or a partial ridge/partial valley in the pixel location, i.e., across the gap, or in, e.g., 2D arrangements at the pixel location formed by the intersection ("crossover") of a transmitter plate, such as A-H in FIG. 1 and a receiver plate (not shown in FIG. 5, but illustrated by way of example in FIG. 1, R1-R-9). It will also be understood, that to the extent the plates are separated by and/or coated for protection by, a material(s) such as a dielectric, further modifications in the received signal can also occur.

The receiver plates 2220 can be addressed either individually, or subsets of the receiver plates 2220 can be addressed as a group. In practice, different groups can be defined such that adjacent groups may have one or more overlapping receiver plates 2220 included in the groups, and these groups may vary in position by only a single pitch distance, p, e.g., as illustrated by way of example in FIG. 15, i.e., from one location on one receiver plate 2220 to the corresponding location on the next succeeding or next preceding receiver plate 2220, in order to retain a high position resolution. For example, one group A might contain receivers 2220-4, 2220-5, and 2220-6, the next group B may contain receivers 2220-5, 2220-6, and 2220-7, and a third group C might contain receivers 2220-6, 2220-7, and 2220-8. During the acquisition of an image, the system and method may receive the signal using group A, followed by B, and then followed by C, and so on. The advantage of doing this is that, by receiving the signals on the multiple receiver plates, e.g., 2220-4, 2220-5 and 2220-6 at once, the effective area of the receiver plates 2220 is increased by 3×, which means the magnitude of the received signal is also increased by approximately 3×. It will be understood that this same effect or nearly so can be effected by similarly increasing the number/size of the transmitting plate(s), e.g., when the embodiment where the receiver plates 2220 of FIGS. 14-16, constitute transmit plates.

Even though the effective size of the receiver plates 2220 has thus been increased, the resolution has not been degraded due to the way the groups, e.g., A, B and C, etc., are defined and stepped across the image area, e.g., the linear one-dimensional array of FIGS. 1, 2A, 2B, 4-7 and 14-16. For example, the center of Group A is receiver 2220-5, the center of group B is receiver 2220-6, and the center of group C is receiver 2220-7. Stepping from A to B to C, the center of the receiver plate 2220 area from 2220-5 to 2220-6 to 2220-7—in other words, the center of the pixel area (respective gaps from the respective receiver plates 2220 to the transmitter plate 2210, moved by one pitch distance (not by 3 pitch distances, which would normally happen, if, e.g., one tripled the width of the respective receiver plate 2220). Thus, in other words, such a method of grouping and stepping allows for triple the effective size of the receiver plate 2220 area without tripling the distance between pixels (which would lowered the resolution).

Figure 15:
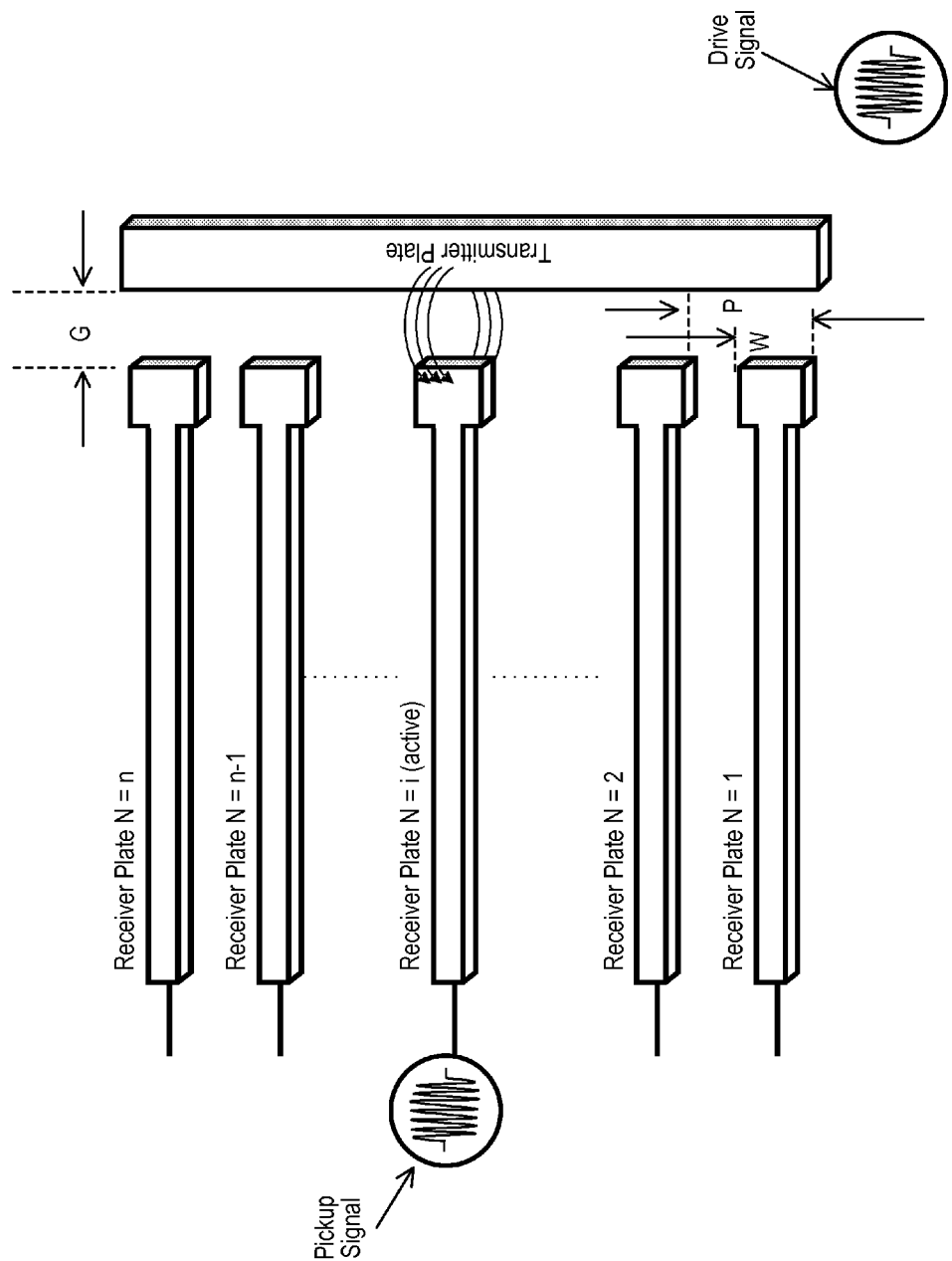
FIG. 15 shows in some further detail an illustration in schematic form of an implementation of the embodiment of FIG. 5, according to aspects of embodiments of the disclosed subject matter.

As illustrated in FIG. 15, an example of a one dimensional linear capacitive gap sensor layout is shown which differs from previous designs for a linear sensor array in the use of a single transmitter plate and multiple receiver plates 2220. An example of such an arrangement where the single plate is the receiver plate is disclosed in co-pending U.S. Provisional Patent Application No. 61/579,994, entitled Methods and Devices for Capacitive Image Sensing, filed on Dec. 23, 2011, e.g., FIGS. 1, 2A, 2B, 4-7 and 14-16, which have been incorporated herein. One advantage of the layout according to the presently disclosed subject matter in FIGS. 14-16 is that it can provide a short path for the receiver signals, along the receiver plates 2220 into the circuitry within the ASIC 2202, thus minimizing parasitic coupling to ground and reducing received (response) signal loss.

This sensor and method according to aspects of the disclosed subject matter may also include approaches to reduce signal noise contributions through differential signal processing. A method for converting such a one dimensional linear capacitive gap array as disclosed in the presently disclosed subject matter to a fully differential scheme is very similar to the above disclosure in the context of a 2D stacked matrix sensor array or a 1D linear array. As noted above such a differential system takes two inputs, a positive and a negative, and subtracts them to obtain the desired signal, without noise, but only if the same noise appears on the positive and the negative terminals.

It will be understood by those skilled in the art that a biometric imaging apparatus and method are disclosed which may comprise a drive signal plate carrying a drive/transmitted signal; a plurality of receiver signal plates defining a plurality of pixel locations with the drive signal plate, or with many drive plates in a 2D array; an electrical path from the drive signal plate to an active receiver signal plate, e.g., one that is connected to a differential output response amplifier for the particular receiver plate for output from a pixel location defined by the single transmitter plate or a respective one of a plurality of transmitter plates, forming an active pixel location with the drive signal/transmitter plate, the electrical path having a electro-magnetic characteristic that is altered in response to a feature of a biometric, such as a finger, when a fingerprint is being sensed, placed in the vicinity of the pixel location, including, e.g., in contact with, or nearly so sufficiently for the biometric, i.e., fingerprint, to interact with an electromagnetic field at the pixel location, and electro-magnetic noise imparted by the biometric at the active pixel location, thereby modulating a response signal output received on the active receiver plate at the active pixel location, in response to the drive signal on the drive signal plate; and a noise reduction circuit having as a first input the response signal from the active pixel location and as a second input a signal, including at least in part a noise cancellation component, received from at least a portion of the plurality of receiver plates other than the active receiver plate. The drive signal plate may form with the plurality of receiver signal plates a linear one dimensional biometric sensor array of pixel locations, or may comprise one of a plurality of drive signal plates, forming with the plurality of receiver signal plates a two dimensional array of pixel locations. The electro-magnetic characteristic may comprise impedance, which may comprise at least in part capacitance forming a linear one dimensional capacitive gap sensor array or a two dimensional capacitive sensor array. The noise reduction circuit may comprise a differential amplifier; and the first input signal applied to one input terminal of the differential amplifier and the second input signal applied to the opposite input terminal of the differential amplifier.

The at least a portion of the plurality of receiver plates other than the active receiver plate may comprise a grouping of the plurality of receiver plates other than the active receiver plate. The active receiver plate may be centrally located within the grouping of the plurality of receiver plates other than the active receiver plate. The grouping of the plurality of receiver plates other than the active receiver plate may comprise all of the receiver plates other than the active receiver plate. The portion of the plurality of receiver plates other than the active receiver plate may be selected to provide a noise cancellation component that includes a balance in an amount of coupling versus loading of the first input and the second input.

A biometric imaging method may comprise supplying a drive signal to a drive signal plate; providing a plurality of receiver signal plates defining a plurality of pixel locations with the drive signal plate; forming an electrical path from the drive signal plate to an active receiver signal plate, forming an active pixel location with the drive signal plate, the electrical path having a electro-magnetic characteristic that is altered in response to a feature of a biometric placed in the vicinity of the pixel location, and electro-magnetic noise imparted by the biometric at the active pixel location, thereby modulating a response signal received on the active receiver plate at the active pixel location, in response to the drive signal on the drive signal plate; and utilizing a noise reduction circuit having as a first input the response signal from the active pixel location and as a second input a signal, including at least in part a noise cancellation component, received from at least a portion of the plurality of receiver plates other than the active receiver plate.

It will be understood that the embodiments described herein are merely exemplary and that a person skilled in the art may make many variations and modifications without departing from the spirit and scope of the invention. For instance, all such variations and modifications are intended to be included within the scope of the invention as defined in the appended claims. It will be understood by those skilled in the art that the present apparatus and method may be incorporated into many useful apparatus and methods where the authentication of a user can be of benefit to security of operation, non-repudiation of transactions, user access to electronic equipment, physical and virtual locations etc.

Some of these might include by way of examples, incorporation into:

a user authentication apparatus providing user authentication for controlling access to one of an electronic user device, such as a portable phone, personal digital assistant, computing devices in general, etc. or an electronically provided service, such as access to a web-site/page, access to and utilization of an email account, access to other on-line data, files and the like;

a user authentication apparatus providing user authentication for controlling an online transaction.

In each of the above, the apparatus may provide for user authentication that is in replacement of at least one of a user password or personal identification number ("PIN").

The sensing circuit may be incorporated into an apparatus providing user authentication for controlling access to a physical location or for demonstrating the user was present at a certain place at a certain time.

The sensing circuit of may be incorporated into an apparatus providing at least one of a finger motion user input or navigation to a computing device.

The sensing circuit may be incorporated into an apparatus providing finger mapping of a user finger to authentication of the user, e.g., for access to or energizing a user electronic device and the performance of at least one other task specific to the particular finger by the user electronic device.

The sensing circuit may be incorporated into a user authentication apparatus providing user authentication for purposes of making an on-line transaction non-repudiatable.

The following is a disclosure by way of example of a computing device which may be used with the presently disclosed subject matter. The description of the various components of a computing device is not intended to represent any particular architecture or manner of interconnecting the components. Other systems that have fewer or more components may also be used with the disclosed subject matter. A communication device may constitute a form of a computing device and may at least emulate a computing device. The computing device may include an inter-connect (e.g., bus and system core logic), which can interconnect such components of a computing device to a data processing device, such as a processor(s) or microprocessor(s), or other form of partly or completely programmable or pre-programmed device, e.g., hard wired and/or application specific integrated circuit ("ASIC") customized logic circuitry, such as a controller or microcontroller, a digital signal processor, or any other form of device that can fetch instructions, operate on pre-loaded/pre-programmed instructions, and/or follow instructions found in hard-wired or customized circuitry, to carry out logic operations that, together, perform steps of and whole processes and functionalities as described in the present disclosure.

In this description, various functions, functionalities and/or operations may be described as being performed by or caused by software program code to simplify description. However, those skilled in the art will recognize what is meant by such expressions is that the functions resulting from execution of the program code/instructions are performed by a computing device as described above, e.g., including a processor, such as a microprocessor, microcontroller, logic circuit or the like. Alternatively, or in combination, the functions and operations can be implemented using special purpose circuitry, with or without software instructions, such as using Application-Specific Integrated Circuit (ASIC) or Field-Programmable Gate Array (FPGA), which may be programmable, partly programmable or hard wired. The application specific integrated circuit ("ASIC") logic may be such as gate arrays or standard cells, or the like, implementing customized logic by metalization(s) interconnects of the base gate array ASIC architecture or selecting and providing metalization(s) interconnects between standard cell functional blocks included in a manufacturers library of functional blocks, etc. Embodiments can thus be implemented using hardwired circuitry without program software code/instructions, or in combination with circuitry using programmed software code/instructions.

Thus, the techniques are limited neither to any specific combination of hardware circuitry and software, nor to any particular tangible source for the instructions executed by the data processor(s) within the computing device. While some embodiments can be implemented in fully functioning computers and computer systems, various embodiments are capable of being distributed as a computing device including, e.g., a variety of forms and capable of being applied regardless of the particular type of machine or tangible computer-readable media used to actually effect the performance of the functions and operations and/or the distribution of the performance of the functions, functionalities and/or operations.

The interconnect may connect the data processing device to define logic circuitry including memory. The interconnect may be internal to the data processing device, such as coupling a microprocessor to on-board cache memory, or external (to the microprocessor) memory such as main memory, or a disk drive, or external to the computing device, such as a remote memory, a disc farm or other mass storage device(s), etc. Commercially available microprocessors, one or more of which could be a computing device or part of a computing device, include a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc, or a 68xxx series microprocessor from Motorola Corporation as examples.

The inter-connect in addition to interconnecting such as microprocessor(s) and memory may also interconnect such elements to a display controller and display device, and/or to other peripheral devices such as input/output (I/O) devices, e.g., through an input/output controller(s). Typical I/O devices can include a mouse, a keyboard(s), a modem(s), a network interface(s), printers, scanners, video cameras and other devices which are well known in the art. The interconnect may include one or more buses connected to one another through various bridges, controllers and/or adapters. In one embodiment the I/O controller may include a USB (Universal Serial Bus) adapter for controlling USB peripherals, and/or an IEEE-1394 bus adapter for controlling IEEE-1394 peripherals.

The memory may include any tangible computer-readable media, which may include but are not limited to recordable and non-recordable type media such as volatile and non-volatile memory devices, such as volatile RAM (Random Access Memory), typically implemented as dynamic RAM (DRAM) which requires power continually in order to refresh or maintain the data in the memory, and non-volatile ROM (Read Only Memory), and other types of non-volatile memory, such as a hard drive, flash memory, detachable memory stick, etc. Non-volatile memory typically may include a magnetic hard drive, a magnetic optical drive, or an optical drive (e.g., a DVD RAM, a CD ROM, a DVD or a CD), or other type of memory system which maintains data even after power is removed from the system.

A server could be made up of one or more computing devices. Servers can be utilized, e.g., in a network to host a network database, compute necessary variables and information from information in the database(s), store and recover information from the database(s), track information and variables, provide interfaces for uploading and downloading information and variables, and/or sort or otherwise manipulate information and data from the database(s). In one embodiment a server can be used in conjunction with other computing devices positioned locally or remotely to perform certain calculations and other functions as may be mentioned in the present application.

At least some aspects of the disclosed subject matter can be embodied, at least in part, utilizing programmed software code/instructions. That is, the functions, functionalities and/or operations techniques may be carried out in a computing device or other data processing system in response to its processor, such as a microprocessor, executing sequences of instructions contained in a memory, such as ROM, volatile RAM, non-volatile memory, cache or a remote storage device. In general, the routines executed to implement the embodiments of the disclosed subject matter may be implemented as part of an operating system or a specific application, component, program, object, module or sequence of instructions usually referred to as "computer programs," or "software." The computer programs typically comprise instructions stored at various times in various tangible memory and storage devices in a computing device, such as in cache memory, main memory, internal or external disk drives, and other remote storage devices, such as a disc farm, and when read and executed by a processor(s) in the computing device, cause the computing device to perform a method(s), e.g., process and operation steps to execute an element(s) as part of some aspect(s) of the method(s) of the disclosed subject matter.

A tangible machine readable medium can be used to store software and data that, when executed by a computing device, causes the computing device to perform a method(s) as may be recited in one or more accompanying claims defining the disclosed subject matter. The tangible machine readable medium may include storage of the executable software program code/instructions and data in various tangible locations, including for example ROM, volatile RAM, non-volatile memory and/or cache. Portions of this program software code/instructions and/or data may be stored in any one of these storage devices. Further, the program software code/instructions can be obtained from remote storage, including, e.g., through centralized servers or peer to peer networks and the like. Different portions of the software program code/instructions and data can be obtained at different times and in different communication sessions or in a same communication session.

The software program code/instructions and data can be obtained in their entirety prior to the execution of a respective software application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a single machine readable medium in entirety at any particular instant of time.

In general, a tangible machine readable medium includes any tangible mechanism that provides (i.e., stores) information in a form accessible by a machine (i.e., a computing device), which may be included, e.g., in a communication device, a network device, a personal digital assistant, a mobile communication device, whether or not able to download and run applications from the communication network, such as the Internet, e.g., an I-phone, Blackberry, Droid or the like, a manufacturing tool, or any other device including a computing device, comprising one or more data processors, etc.

In one embodiment, a user terminal can be a computing device, such as in the form of or included within a PDA, a cellular phone, a notebook computer, a personal desktop computer, etc. Alternatively, the traditional communication client(s) may be used in some embodiments of the disclosed subject matter.

While some embodiments of the disclosed subject matter have been described in the context of fully functioning computing devices and computing systems, those skilled in the art will appreciate that various embodiments of the disclosed subject matter are capable of being distributed, e.g., as a program product in a variety of forms and are capable of being applied regardless of the particular type of computing device machine or computer-readable media used to actually effect the distribution.

The disclosed subject matter may be described with reference to block diagrams and operational illustrations of methods and devices to provide a system and methods according to the disclosed subject matter. It will be understood that each block of a block diagram or other operational illustration (herein collectively, "block diagram"), and combination of blocks in a block diagram, can be implemented by means of analog or digital hardware and computer program instructions. These computing device software program code/instructions can be provided to the computing device such that the instructions, when executed by the computing device, e.g., on a processor within the computing device or other data processing apparatus, the program software code/instructions cause the computing device to perform functions, functionalities and operations of a method(s) according to the disclosed subject matter, as recited in the accompanying claims, with such functions, functionalities and operations specified in the block diagram.

It will be understood that in some possible alternate implementations, the function, functionalities and operations noted in the blocks of a block diagram may occur out of the order noted in the block diagram. For example, the function noted in two blocks shown in succession can in fact be executed substantially concurrently or the functions noted in blocks can sometimes be executed in the reverse order, depending upon the function, functionalities and operations involved. Therefore, the embodiments of methods presented and described as a flowchart(s) in the form of a block diagram in the present application are provided by way of example in order to provide a more complete understanding of the disclosed subject matter. The disclosed flow and concomitantly the method(s) performed as recited in the accompanying claims are not limited to the functions, functionalities and operations illustrated in the block diagram and/or logical flow presented herein. Alternative embodiments are contemplated in which the order of the various functions, functionalities and operations may be altered and in which sub-operations described as being part of a larger operation may be performed independently or performed differently than illustrated or not performed at all.

Although some of the drawings may illustrate a number of operations in a particular order, functions, functionalities and/or operations which are not now known to be order dependent, or become understood to not be order dependent, may be reordered and other operations may be combined or broken out. While some reordering or other groupings may have been specifically mentioned in the present application, others will be or may become apparent to those of ordinary skill in the art and so the disclosed subject matter does not present an exhaustive list of alternatives. It should also be recognized that the aspects of the disclosed subject matter may be implemented in parallel or seriatim in hardware, firmware, software or any combination(s) thereof co-located or remotely located, at least in part, from each other, e.g., in arrays or networks of computing devices, over interconnected networks, including the Internet, and the like.

The disclosed subject matter is described in the present application with reference to one or more specific exemplary embodiments thereof. Such embodiments are provided by way of example only. It will be evident that various modifications may be made to the disclosed subject matter without departing from the broader spirit and scope of the disclosed subject matter as set forth in the appended claims. The specification and drawings are, accordingly, to be regarded in an illustrative sense for explanation of aspects of the disclosed subject matter rather than a restrictive or limiting sense. Numerous variations, changes, and substitutions will now occur to those skilled in the art without departing from the disclosed subject matter. It should be understood that various alternatives to the embodiments of the disclosed subject matter described herein may be employed in practicing the disclosed subject matter. It is intended that the following claims define the scope of the disclosed subject matter and that methods and structures within the scope of these claims and their equivalents be covered thereby.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A sensing circuit comprising:
   a plurality of transmitting or receiving elements each defining a pixel location defined by a gap between the respective one of the plurality of transmitting or receiving elements and a single element of the opposing type to the respective transmitting or receiving element; and
   a controller configured to provide or receive a probing signal to or from a group of at least two of the plurality of transmitting or receiving elements, at the same time, thereby increasing an effective area providing the transmitting of or the receiving of the probing signal for each pixel location imaged,
   wherein at least two of the transmitting or receiving elements included in the group of at least two of the plurality of transmitting or receiving elements are separated by at least one transmitting or receiving element that is not energized by the probing signal.

2. The sensing circuit of claim 1 further wherein the group of at least two transmitting or receiving elements forms a symmetric pattern.

3. The sensing circuit of claim 2 wherein the symmetric pattern is centered on the pixel location.

4. The sensing circuit of claim 1 wherein the plurality of transmitting or receiving elements forms at least one linear pixel array with the single element of the opposing type.

5. The sensing circuit of claim 4 wherein the at least one linear pixel array comprises a first linear pixel array and a second linear pixel array, the sensing circuit further comprising:
   an output signal generator combining an output of pixel locations in the first linear pixel array and in the second linear pixel array.

6. The sensing circuit of claim 4 wherein the controller is configured to transmit or receive the probing signal for respective pixel locations being imaged randomly along the respective linear pixel array.

7. A method of operating a sensing circuit comprising:
   providing a plurality of transmitting or receiving elements each defining a pixel location defined by a gap between the respective one of the plurality of transmitting or receiving elements and a single element of the opposing type to the respective transmitting or receiving element; and providing or receiving via a controller circuit a probing signal to or from a group of at least two of the plurality of transmitting or receiving elements, at the same time, thereby increasing an effective area providing the transmitting of or the receiving of the probing signal for each pixel location imaged, wherein at least two of the transmitting or receiving elements included in the group of at least two of the plurality of transmitting or receiving elements are separated by at least one transmitting or receiving element that is not energized by the probing signal.

8. The method of claim 7 further wherein the group of at least two transmitting or receiving elements forms a symmetric pattern.

9. The method of claim 8 wherein the symmetric pattern is centered on the pixel location.

10. The method of claim 7 wherein the plurality of transmitting or receiving elements forms at least one linear pixel array with the single element of the opposing type.

11. The method of claim 10 wherein the at least one linear pixel array comprises a first linear pixel array and a second linear pixel array, the method further comprising:

providing an output signal generator combining an output of pixel locations in the first linear pixel array and in the second linear pixel array.

12. The method of claim 10 wherein the controller circuit is configured to transmit or receive the probing signal for respective pixel locations being imaged randomly along the respective linear pixel array.

13. A sensing circuit, comprising:

a plurality of transmitting elements each defining at least one pixel location defined by a gap between the respective one of the plurality of transmitting elements and at least one receiving element; and a controller configured to receive a probing signal from a group of at least two of the plurality of transmitting elements, at the same time, to increase an effective area of the at least one pixel location, wherein at least two of the transmitting elements included in the group of at least two of the plurality of transmitting elements are separated by at least one transmitting element that is not energized by the probing signal.

14. The sensing circuit of claim 13, wherein the at least one receiving element includes a plurality of receiving elements, and wherein the plurality of transmitting elements forms a 2D pixel array with the plurality of receiving elements.

15. A sensing circuit, comprising:

a plurality of receiving elements each defining at least one pixel location defined by a gap between the respective one of the plurality of receiving elements and at least one transmitting element; and a controller configured to provide a probing signal to a group of at least two of the plurality of receiving elements, at the same time, to increase an effective area of the at least one pixel location, wherein at least two of the receiving elements included in the group of at least two of the plurality of receiving elements are separated by at least one receiving element that is not energized by the probing signal.

16. The sensing circuit of claim 15, wherein the at least one transmitting element includes a plurality of transmitting elements, wherein the plurality of receiving elements forms a 2D pixel array with the plurality of transmitting elements.

* * * * *